US012053862B2

(12) United States Patent
Abbott et al.

(10) Patent No.: US 12,053,862 B2
(45) Date of Patent: Aug. 6, 2024

(54) ROTARY IMPACT TOOL

(71) Applicant: MILWAUKEE ELECTRIC TOOL CORPORATION, Brookfield, WI (US)

(72) Inventors: Jonathan E. Abbott, Milwaukee, WI (US); Jacob P. Schneider, Cedarburg, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 17/245,620

(22) Filed: Apr. 30, 2021

(65) Prior Publication Data

US 2021/0339361 A1 Nov. 4, 2021

Related U.S. Application Data

(60) Provisional application No. 63/018,669, filed on May 1, 2020.

(51) Int. Cl.
*B25B 21/02* (2006.01)
*B25D 17/06* (2006.01)

(52) U.S. Cl.
CPC .............. *B25B 21/02* (2013.01); *B25D 17/06* (2013.01); *B25D 2250/121* (2013.01)

(58) Field of Classification Search
CPC ......... B25B 21/02; B25B 21/026; B25C 5/06; B25C 5/15; B25D 11/102; B25D 17/06; B25D 2216/0023; B25D 2250/121
See application file for complete search history.

(56) References Cited

U.S. PATENT DOCUMENTS 2,160,150 A * 5/1939 Jimerson ............... B25B 21/026 173/93.6
2,160,622 A * 5/1939 Olson ................... B25B 21/026 173/93.6
(Continued)

FOREIGN PATENT DOCUMENTS

EP 2871029 A1 5/2015
JP 3678962 B2 * 8/2005 ............. B25B 21/02
(Continued)

OTHER PUBLICATIONS

International Search Report and Written Opinion for Application No. PCT/US2021/030136 dated Aug. 20, 2021 (10 pages).
(Continued)

*Primary Examiner* — Thomas M Wittenschlaeger
*Assistant Examiner* — David G Shutty
(74) *Attorney, Agent, or Firm* — Michael Best & Friedrich LLP

(57) ABSTRACT

A rotary impact tool includes a housing, an electric motor supported in the housing, and an impact mechanism for converting a continuous torque input from the motor to consecutive rotational impacts upon a workpiece. The impact mechanism includes an anvil and a hammer that is both rotationally and axially movable relative to the anvil for imparting the consecutive rotational impacts upon the anvil. The hammer is configured to rotate about an axis in a rotational direction when imparting the consecutive rotational impacts upon the anvil. The impact mechanism also includes a spring for biasing the hammer in an axial direction toward the anvil, and a means for biasing the anvil in the rotational direction about the axis.

15 Claims, 21 Drawing Sheets

(56) References Cited

U.S. PATENT DOCUMENTS 2,533,703 A * 12/1950 Wilhide .................. B25B 21/02 81/464
2,968,960 A * 1/1961 Fulop .................. B25D 11/005 173/132
3,090,450 A * 5/1963 Fulop .................. B25D 11/102 173/109
3,128,400 A * 4/1964 Hornschuch ......... H02K 49/108 173/93.6
3,133,601 A * 5/1964 Fulop .................. B25D 11/104 173/101
3,150,725 A * 9/1964 Hornschuch ............ B25B 21/02 464/29
3,208,568 A * 9/1965 Vaughn ................ B25B 21/026 173/93
3,414,066 A * 12/1968 Wallace ............... B25B 21/026 173/93.6
3,685,594 A * 8/1972 Koehler ................. B25D 17/02 173/205
3,837,410 A * 9/1974 Maxwell .............. B25D 11/102 173/109
4,168,751 A * 9/1979 Deike ...................... E02D 7/10 173/133
4,609,089 A 9/1986 Kobayashi et al.
5,145,369 A * 9/1992 Lustig .................... A61C 17/00 433/118
5,158,354 A * 10/1992 Simonin ............... B60B 29/006 81/464
5,992,538 A * 11/1999 Marcengill .......... B25D 11/102 173/171
6,223,834 B1 * 5/2001 Takamura ............... B25B 21/02 173/93.5
6,457,535 B1 * 10/2002 Tanaka .................... B25B 21/02 173/48
7,032,687 B2 * 4/2006 Rask ....................... B44B 3/005 173/211
7,137,458 B2 * 11/2006 Yung .................... B25D 11/102 173/205
7,520,414 B2 * 4/2009 Blessing ................... B25C 5/15 173/117
9,114,514 B2 * 8/2015 Leong ..................... B25B 21/00
9,289,886 B2 * 3/2016 Limberg ............. B25B 23/1405
9,539,708 B2 1/2017 Hoop et al.
9,937,610 B2 * 4/2018 Wannaquot ............... B25C 1/04
2005/0109519 A1 * 5/2005 Kawai ................... B25B 21/026 173/183
2005/0263305 A1 * 12/2005 Shimizu .................. B25B 21/02 173/176
2006/0254789 A1 * 11/2006 Murakami .............. B25F 5/006 173/128
2007/0278276 A1 * 12/2007 Wen .......................... B25C 1/00 227/130
2007/0289760 A1 * 12/2007 Sterling .................. B25B 21/02 173/104
2008/0073092 A1 * 3/2008 Yeoh ...................... B25B 21/02 173/48
2008/0190988 A1 * 8/2008 Pedicini .................... B25C 1/04 137/540
2009/0166394 A1 * 7/2009 Gyorkos ................... B25C 1/04 227/156
2010/0038395 A1 * 2/2010 Krondorfer ............... B25C 1/06 227/8
2010/0213232 A1 * 8/2010 Krondorfer ............... B25C 5/15 227/129
2013/0199814 A1 * 8/2013 Yew ........................ B25B 21/02 173/211
2015/0041163 A1 2/2015 McClung
2015/0217431 A1 * 8/2015 Seith ....................... B25B 21/02 81/121.1
2018/0163474 A1 * 6/2018 Kartha ...................... E21B 6/02
2020/0039047 A1 * 2/2020 Keister ..................... B25C 7/00
2020/0215668 A1 7/2020 Duncan et al.
2020/0262044 A1 * 8/2020 Ferris .................... B25C 5/1648
2021/0053201 A1 * 2/2021 Mandal ................... B25F 5/006
2021/0086333 A1 * 3/2021 Murakami .............. B25B 21/02

FOREIGN PATENT DOCUMENTS

JP 2007007852 A 1/2007
JP 2012045669 A * 3/2012 ............ B25B 21/02
JP 2016175144 A * 10/2016 ............ B25B 21/02
WO 2017147437 A1 8/2017

OTHER PUBLICATIONS

Extended European Search Report for Application No. 21796018.6 dated Apr. 15, 2024 (8 pages).

* cited by examiner

ROTARY IMPACT TOOL

CROSS-REFERENCE TO RELATED APPLICATIONS

This application claims priority to U.S. Provisional Patent Application No. 63/018,669, filed May 1, 2020, the entire content of which is incorporated herein by reference.

FIELD OF THE INVENTION

The present invention relates to power tools, and more specifically to impact and hydraulic pulse tools.

BACKGROUND OF THE INVENTION

Impact tools typically include a drive assembly for converting a continuous torque input (e.g., from an electric motor or pneumatic turbine) into consecutive impacts upon an anvil or tool element, which in turn transmits the impacts to a workpiece. Axial impact tools are configured to deliver impacts to the anvil or tool element along a longitudinal axis of the anvil or tool element, to perform tasks such as nailing or percussive drilling. Rotary impact tools are configured to deliver rotational impacts (i.e. discrete applications of torque) to the anvil or tool element in a rotational direction about the longitudinal axis. Rotary impact tools may convert the continuous torque input into rotational impacts using a striking impact mechanism or a hydraulic pulse impact mechanism.

SUMMARY OF THE INVENTION

The present invention provides, in one aspect, a rotary impact tool comprising a housing, an electric motor supported in the housing, and an impact mechanism for converting a continuous torque input from the motor to consecutive rotational impacts upon a workpiece. The impact mechanism includes an anvil and a hammer that is both rotationally and axially movable relative to the anvil for imparting the consecutive rotational impacts upon the anvil. The hammer is configured to rotate about an axis in a rotational direction when imparting the consecutive rotational impacts upon the anvil. The impact mechanism also includes a spring for biasing the hammer in an axial direction toward the anvil, and a means for biasing the anvil in the rotational direction about the axis.

In some embodiments, the impact mechanism includes a camshaft driven by the motor to rotate about the axis, and the hammer is axially movable along the camshaft.

In some embodiments, the camshaft includes a bore extending parallel to the axis, and the means for biasing the anvil includes a pin received within the bore and a spring configured to bias the pin into engagement with the anvil.

In some embodiments, the anvil includes a rear face facing the hammer and a groove formed in the rear face, and the pin is configured to travel along the groove in response to rotation of the camshaft relative to the anvil.

In some embodiments, the groove includes an inclined surface oriented at an angle relative to the rear face, wherein the pin is engageable with the inclined surface, and engagement between the pin and the inclined surface imparts a moment on the anvil in the rotational direction about the axis.

In some embodiments, the means for biasing the anvil includes a washer positioned between the camshaft and the anvil.

In some embodiments, the anvil includes a rear face facing the hammer and a groove formed in the rear face, the washer includes a leaf spring having a distal end, and the distal end of the leaf spring is configured to travel along the groove in response to rotation of the camshaft relative to the anvil.

In some embodiments, the means for biasing the anvil includes a viscous region between the anvil and the camshaft.

In some embodiments, the means for biasing the anvil includes a magnet.

In some embodiments, the anvil includes a rearward extension that extends rearwardly through the camshaft.

In some embodiments, the electric motor includes a rotor, and the means for biasing the anvil includes a spring extending between the rotor and the rearward extension.

In some embodiments, a sensor is configured to detect rotation of the rearward extension.

The present invention provides, in another aspect, a rotary impact tool comprising a housing, an electric motor supported in the housing, and an impact mechanism for converting a continuous torque input from the motor to consecutive rotational impacts upon a workpiece. The impact mechanism includes an anvil arranged forward of the motor. The anvil includes a rearward extension. The impact mechanism further includes a hammer that is both rotationally and axially movable relative to the anvil for imparting the consecutive rotational impacts upon the anvil. The hammer is configured to rotate about an axis in a rotational direction when imparting the consecutive rotational impacts upon the anvil. The impact mechanism also includes a spring for biasing the hammer in an axial direction toward the anvil. The rotary impact tool further comprises a sensor positioned rearward of the motor. The sensor is configured to detect a rotation of the rearward extension.

In some embodiments, operation of the motor can be adjusted in response to the detected rotation of the rearward extension.

In some embodiments, a magnet is positioned on the rearward extension of the anvil. The sensor is configured to detect rotation of the magnet.

In some embodiments, the rearward extension extends through the motor.

The present invention provides, in yet another aspect, a power tool comprising a housing, a motor arranged in the housing, and a striking mechanism for converting a continuous torque input from the motor to consecutive axial impacts upon a workpiece, fastener or tool bit. The striking mechanism includes an anvil configured to deliver the consecutive axial impacts to the workpiece, fastener or tool bit, and a means for biasing the anvil in an axial direction toward the workpiece, fastener or tool bit.

In some embodiments, the power tool is a palm nailer.

In some embodiments, the power tool is a rotary hammer.

In some embodiments, means for biasing the anvil includes a compression spring.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
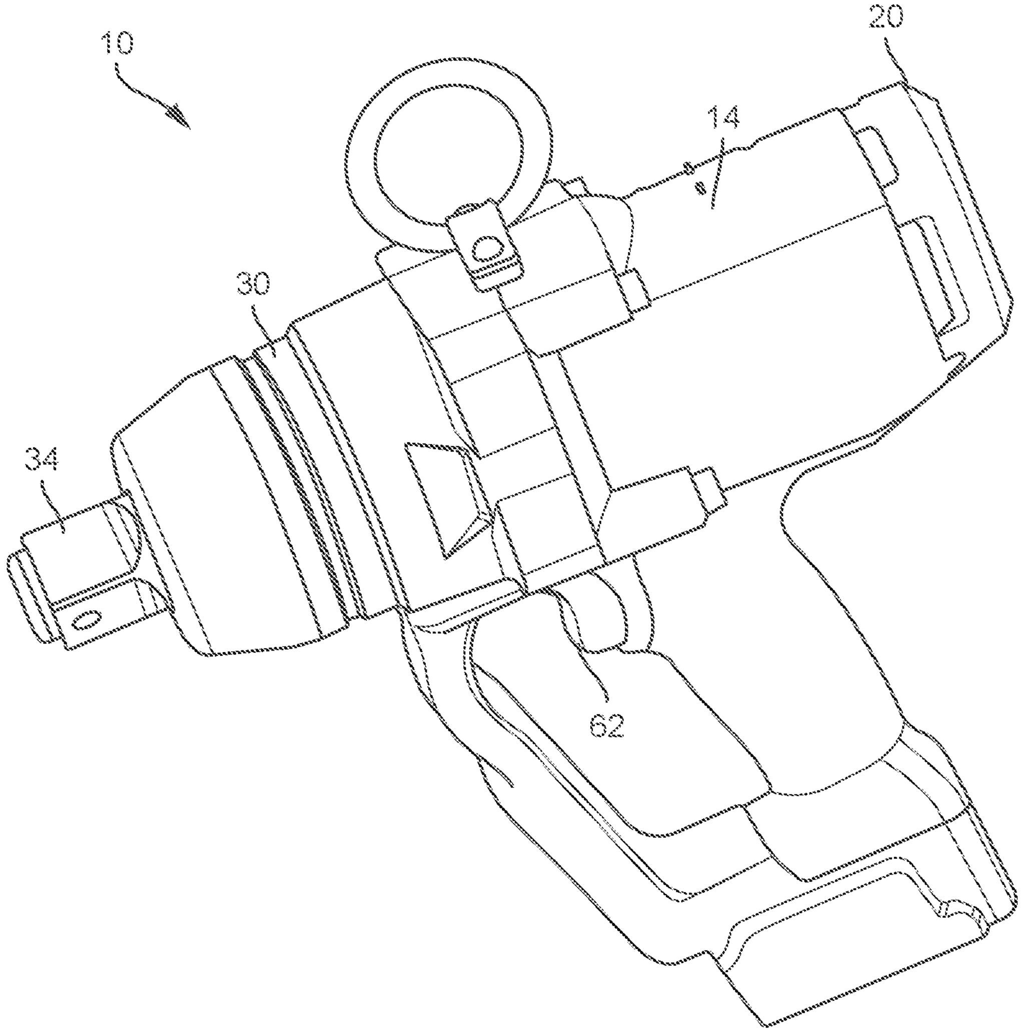
FIG. 1 is a perspective view of a rotary impact driver in accordance with an embodiment of the invention.
Figure 2:
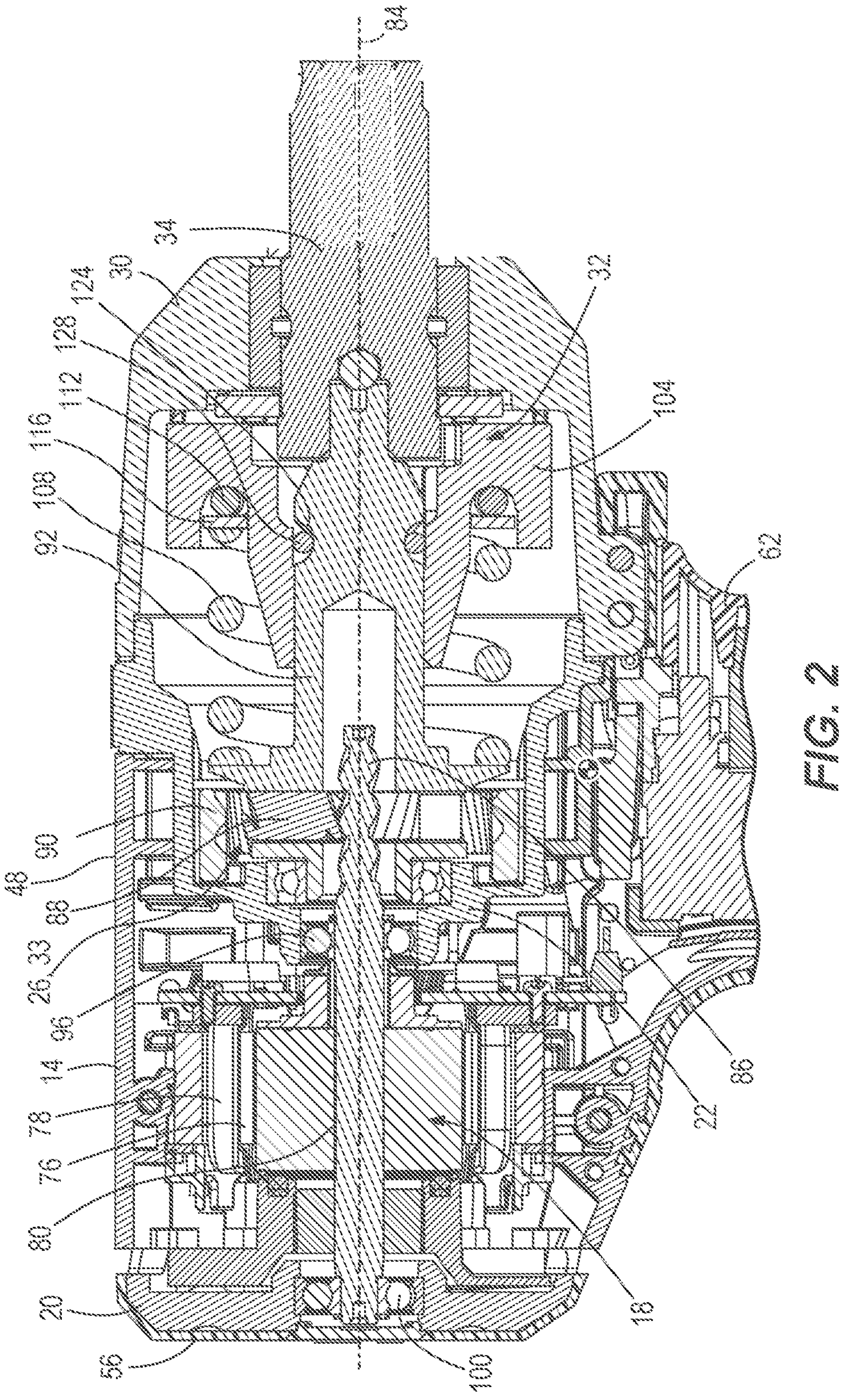
FIG. 2 is a partial cross-sectional view of the impact driver of FIG. 1.
Figure 2A:
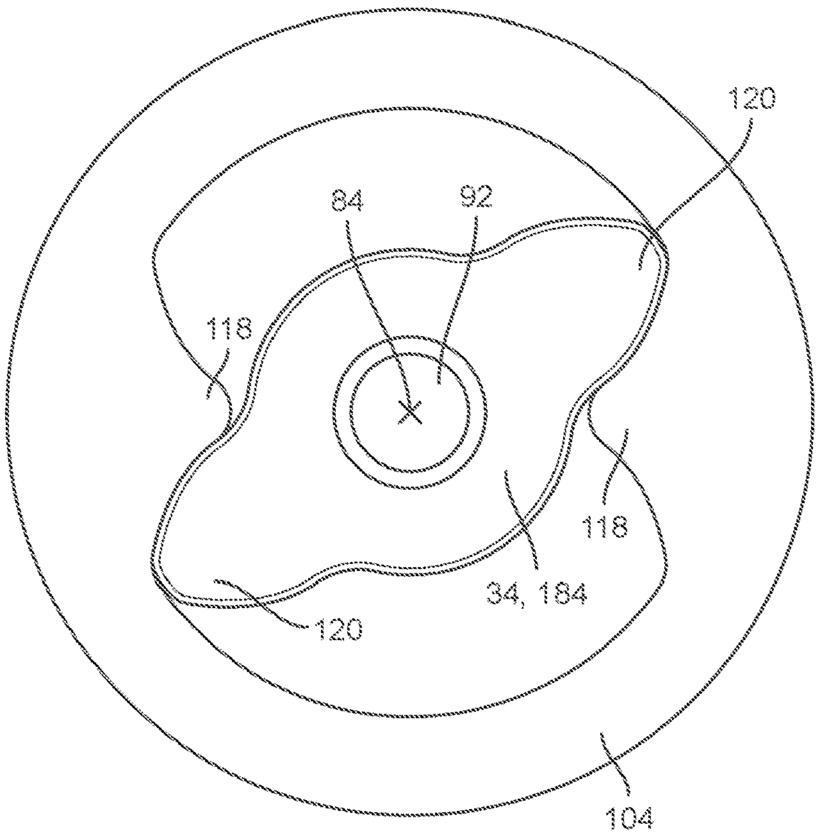
FIG. 2A is a partial cross-sectional view of the impact driver of FIG. 1, with portions removed.

FIGS. 1-2A illustrate a power tool in the form of a rotary impact tool or impact driver 10. The impact driver 10 includes a motor housing 14 in which an electric motor 18 is supported (FIG. 2), an end cap 20 coupled to a rear end of the motor housing 14, a gear case 22 at least partially housing a gear assembly 26, and an impact housing 30 housing an impact mechanism 32. The gear assembly 26 and impact mechanism 32 are part of a drive assembly 33 for converting a continuous torque input from the motor 18 to consecutive rotational impacts upon a workpiece, as described in further detail below.

The impact mechanism 32 includes an anvil 34 for performing fastening or loosening operations on, e.g., fasteners. In the embodiment of FIGS. 1-2A, the anvil 34 has a square drive end configured to receive a socket, but in other embodiments, such as that shown in FIG. 2B, the distal end of the anvil 34 includes a longitudinal bore 35 in which a tool bit is receivable, such that the tool bit can perform fastening or loosening operations on, e.g., fasteners, in response to receiving torque from the anvil 34. The embodiment of FIG. 2B also includes a bit retention assembly 36 that facilitates retention and removal of the tool bit from the longitudinal bore 35 of the anvil 34. In some embodiments, the bit retention assembly 36 is similar or identical to the bit retention assembly described in U.S. patent application Ser. No. 16/738,113, filed on Jan. 9, 2020, the entire contents of which are incorporated herein by reference.

As described in further detail below and as shown in FIG. 2, the gear assembly 26 transfers torque from the motor 18 to the impact mechanism 32, which delivers periodic rotational impacts to the anvil 34, thereby causing the anvil 34 to rotate. The motor 18 is preferably a brushless direct current ("BLDC") motor with a stator 76 that has a plurality of stator windings 78 (FIG. 2). The motor 18 also includes a rotor 80 or motor output shaft, which, in some embodiments, includes a plurality of permanent magnets.

The rotor 80 is rotatable about an axis 84 to provide a rotational input to the gear assembly 26, and the impact mechanism 32 is coupled to an output of the gear assembly 26. As such, the gear assembly 26 provides a speed reduction between the rotor 80 and the impact mechanism 32.

With continued reference to FIG. 2, the illustrated gear assembly 26 includes a helical pinion 86 formed on the rotor 80, a plurality of helical planet gears 88 meshed with the helical pinion 86, and a helical ring gear 90 meshed with the planet gears 88 and rotationally fixed within the gear case 22. The planet gears 88 are mounted on a camshaft 92 of the impact mechanism 32 such that the camshaft 92 functions as a planet carrier. Accordingly, rotation of the rotor 80 rotates the planet gears 88, which then rotate along the inner circumference of the ring gear 90 and thereby rotate the camshaft 92. The rotor 80 is rotatably supported by a first or forward bearing 96 and a second or rear bearing 100, which in turn is supported by the end cap 20.

The impact mechanism 32 of the impact driver 10 will now be described with reference to FIG. 2. The impact mechanism 32 includes the anvil 34, which extends from the impact housing 30. The impact mechanism 32 is configured to convert the continuous rotational force or torque provided by the motor 18 and gear assembly 26 to a striking rotational force or intermittent applications of torque to the anvil 34 when the reaction torque on the anvil 34 (e.g., due to engagement between the tool element and a fastener being worked upon) exceeds a certain threshold. In the illustrated embodiment of the impact driver 10, the impact mechanism 32 includes the camshaft 92, a hammer 104 supported on and axially slidable relative to the camshaft 92, and the anvil 34.

The impact mechanism 32 further includes a hammer spring 108 biasing the hammer 104 toward the front of the impact driver 10 (i.e., toward the right in FIG. 2). In other words, the hammer spring 108 biases the hammer 104 in an axial direction toward the anvil 34, along the axis 84. A thrust bearing 112 and a thrust washer 116 are positioned between the hammer spring 108 and the hammer 104. The thrust bearing 112 and the thrust washer 116 allow for the hammer spring 108 and the camshaft 92 to continue to rotate relative to the hammer 104 after each impact strike when lugs 118 (FIG. 2A) on the hammer 104 engage with corresponding anvil lugs 120 and rotation of the hammer 104 momentarily stops.

The camshaft 92 further includes cam grooves 124 in which corresponding cam balls 128 are received (FIG. 2). The cam balls 128 are in driving engagement with the hammer 104 such that movement of the cam balls 128 within the cam grooves 124 allows for relative axial movement of the hammer 104 along the camshaft 92 when the hammer lugs 118 and the anvil lugs 120 are engaged, rotation of the anvil 34 is seized, and the camshaft 92 continues to rotate.

In operation of the impact driver 10, the operator depresses a trigger 62 to activate the motor 18, which continuously drives the gear assembly 26 and the camshaft 92 via the rotor 80. As the camshaft 92 rotates, the cam balls 128 drive the hammer 104 to co-rotate in a working rotational direction with the camshaft 92 about the axis 84, and the hammer lugs 118 engage, respectively, driven surfaces of the anvil lugs 120 to provide an impact and to rotatably drive the anvil 34 in the working rotational direction. After each impact, the hammer 104 moves or slides rearward along the camshaft 92, away from the anvil 34, so that the hammer lugs 118 disengage the anvil lugs 120. The hammer spring 108 stores some of the rearward energy of the hammer 104 to provide a return mechanism for the hammer 104. After the hammer lugs 118 disengage the respective anvil lugs 120, the hammer 104 continues to rotate in the working rotational direction and moves or slides forwardly, toward the anvil 34, as the hammer spring 108 releases its stored energy, until the drive surfaces of the hammer lugs 118 re-engage the driven surfaces of the anvil lugs 120 to cause another impact.

FIGS. 3A-5 illustrate another embodiment of a rotary impact mechanism 1000, which may be incorporated, for example, into the impact tool 10 of FIG. 1 (e.g., in place of the impact mechanism 32). Specifically, with reference to FIGS. 3A and 3B, the rotary impact mechanism 1000 includes a hammer or cylinder 1026 coupled for co-rotation with an output of the gear assembly 26 (FIG. 2). The rotary impact mechanism 1000 also includes a camshaft 1038, the purpose of which is explained in detail below, attached to the cylinder 1026 for co-rotation therewith about a longitudinal axis 1034. Although the camshaft 1038 is shown as a separate component from the cylinder 1026, the camshaft 1038 may alternatively be integrally formed as a single piece with the cylinder 1026.

Figure 5:
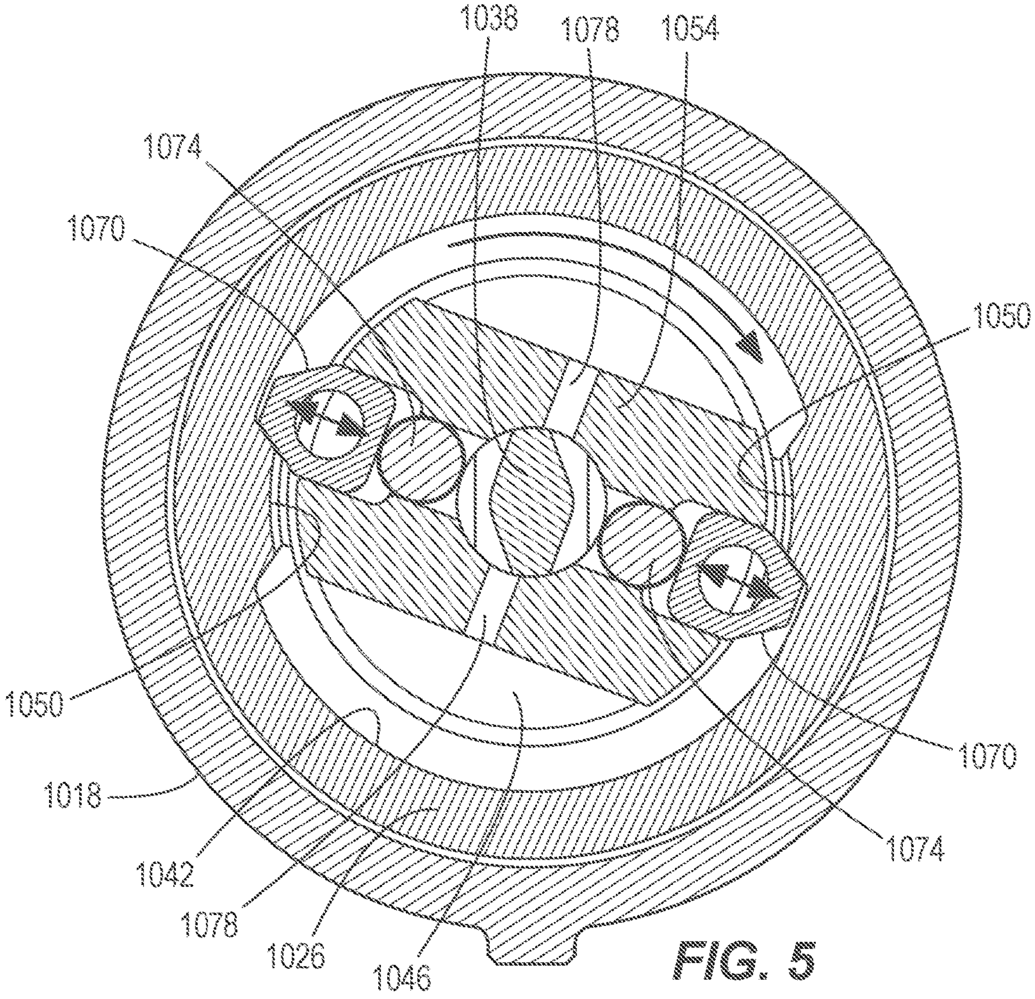
FIG. 5 is an assembled, cross-sectional view of a portion of the impact mechanism of FIG. 3A.

With reference to FIG. 5, the cylinder 1026 includes a cylindrical interior surface 1042, which partly defines a cavity 1046, and a pair of radially inward-extending protrusions 1050 extending from the interior surface 1042 on opposite sides of the longitudinal axis 1034. In other words, the protrusions 1060 are spaced from each other by 180 degrees. The rotary impact mechanism 1000 further includes an anvil or output shaft 1054 (FIGS. 3A-4), having a rear portion 1058 disposed within the cavity 1046 and a front portion 1062. In the embodiment of FIGS. 3A-5, the front portion 1062 extends from the housing 14 and includes a hexagonal receptacle 1066 (FIG. 4) therein for receipt of a tool bit.

The rotary impact mechanism 1000 also includes a pair of pulse blades 1070 (FIGS. 3 and 5) protruding from the output shaft 1054 to abut the interior surface 1042 of the cylinder 1026 and a pair of ball bearings 1074 are positioned between the camshaft 1038 and the respective pulse blades 1070. The output shaft 1054 has dual inlet orifices 1078 (FIG. 4), each of which extends between and selectively fluidly communicates the cavity 1046 and a separate high pressure cavity 1082 within the output shaft 1054. The output shaft 1054 also includes dual outlet orifices 1086 (FIG. 4) that are variably obstructed by an orifice screw 1090 (FIGS. 3A and 3B), thereby limiting the volumetric flow rate of hydraulic fluid that may be discharged from the output shaft cavity 1082, through the orifices 1086, and to the cylinder cavity 1046. The camshaft 1038 is disposed within the output shaft cavity 1082 and is configured to selectively seal the inlet orifices 1078.

Figure 3A:
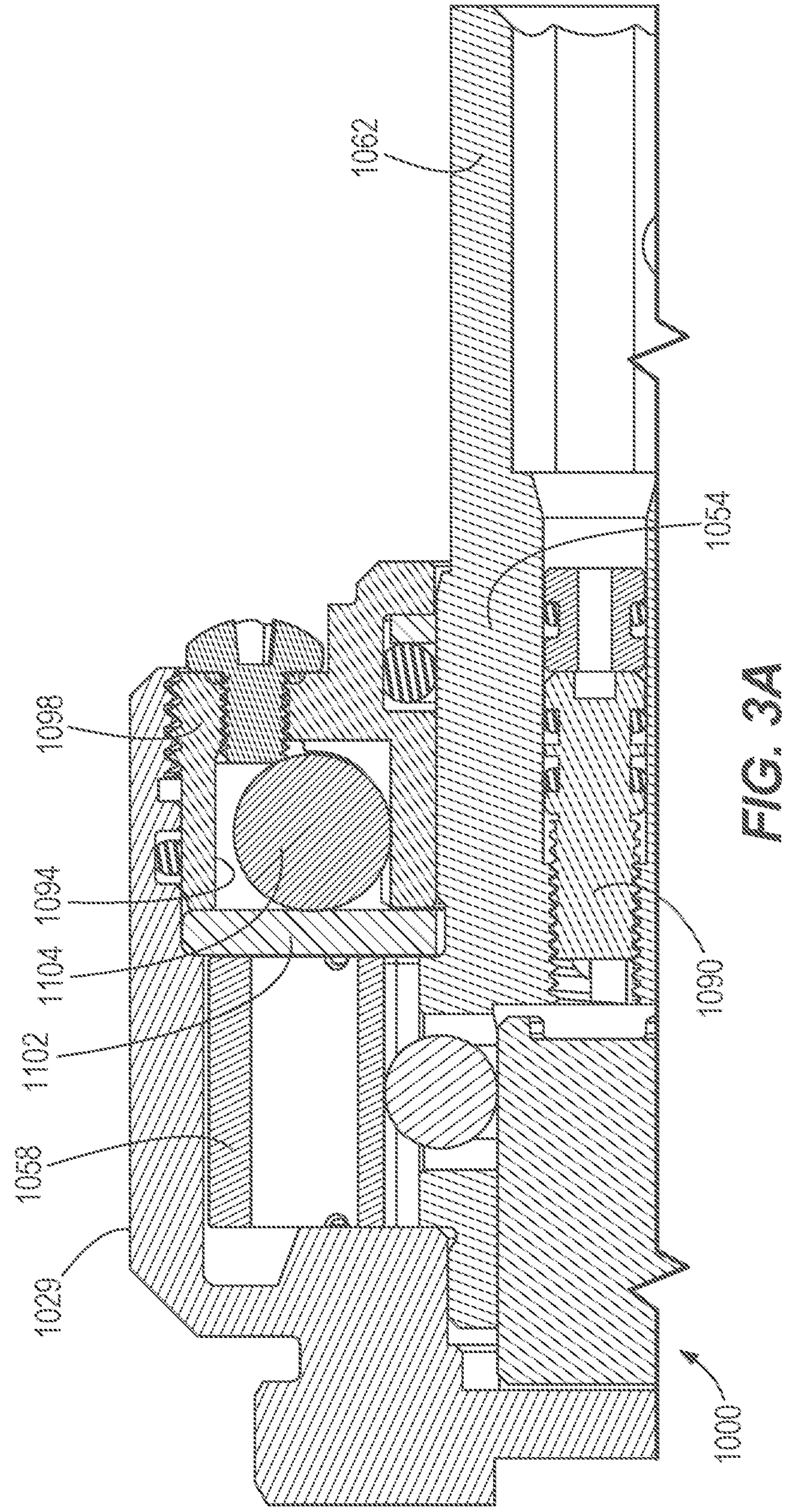
FIG. 3A is an assembled, cross-sectional view of another impact mechanism of the impact tool of FIG. 1 in accordance with another embodiment of the invention.

With reference to FIG. 3A, the cavity 1046 is in communication with a bladder cavity 1094, defined by an end cap 1098 attached for co-rotation with the cylinder 1026 (collectively referred to as a "cylinder assembly"), located adjacent the cavity 1046 and separated by a plate 1102 having apertures 1108 for communicating hydraulic fluid between the cavities 1046, 1094. A collapsible bladder 1104 having an interior volume 1142 filled with a gas, such as air at atmospheric temperature and pressure, is positioned within the bladder cavity 1094. The bladder 1104 is configured to be collapsible to compensate for thermal expansion of the hydraulic fluid during operation of the rotary impact mechanism 1000, which can negatively impact performance characteristics.

Figure 3B:
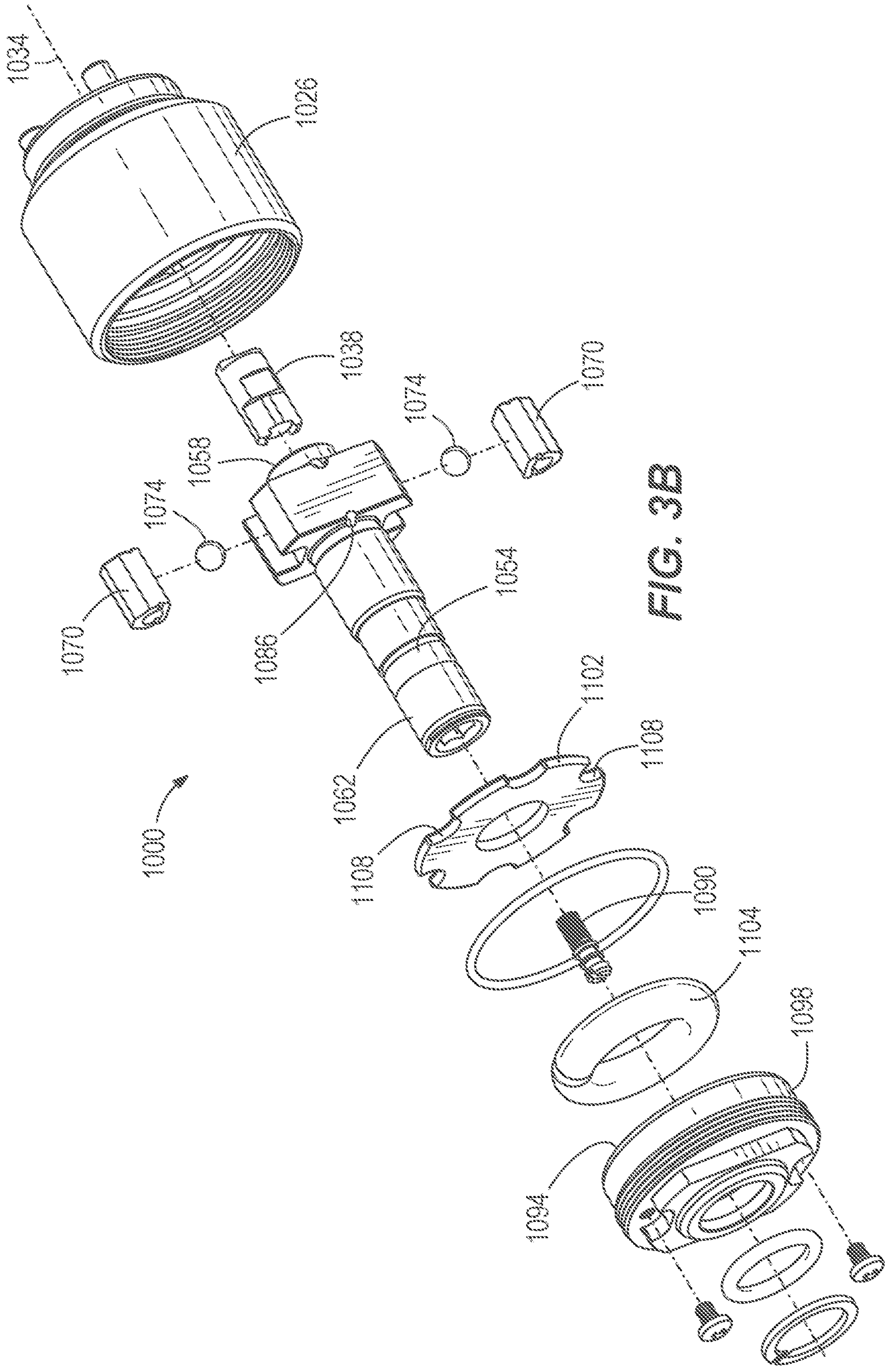
FIG. 3B is an exploded perspective view of a first impact mechanism of FIG. 3A.
Figure 4:
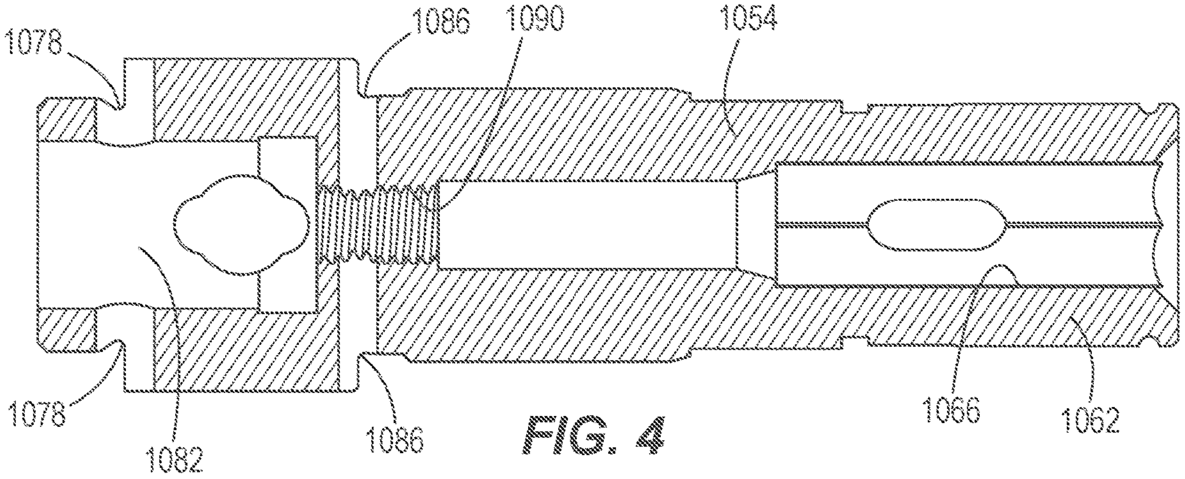
FIG. 4 is a cross-sectional view of an output shaft of the impact mechanism shown in FIG. 3A.

As shown in FIGS. 3A and 3B, prior to the end cap 1098 being threaded into the cylinder 1026, the collapsible bladder 1104 is bent into an annular shape and set into the bladder cavity 1094, which is also annular. Alternatively, the collapsible bladder 1104 can take any shape that permits the bladder to be set by fitment with the cavity 1094 and still effectively compensate for thermal expansion of the hydraulic fluid in the cavities 1046, 1094. After the end cap 1098 is threaded to the cylinder 1026, the collapsible bladder 1104 is trapped via fitment within the cavity 1094, having its annular shape maintained by the shape of the cavity 1094 itself.

In operation, upon activation of the motor 18 (e.g., by depressing a trigger 62), torque from the motor 18 is transferred to the cylinder 1026 via the gear assembly 26 (FIG. 2), causing the cylinder 1026 and camshaft 1038 to rotate in unison relative to the output shaft 1054 until the protrusions 1050 on the cylinder 1026 impact the respective pulse blades 1070 to deliver a first rotational impact to the output shaft 1054. Just prior to the first rotational impact, the inlet orifices 1078 are blocked by the camshaft 1038, thus sealing the hydraulic fluid in the output shaft cavity 1082 at a relatively high pressure, which biases the ball bearings 1074 and the pulse blades 1070 radially outward to maintain the pulse blades 1070 in contact with the interior surface 1042 of the cylinder. For a short period of time following the initial impact between the protrusions 1050 and the pulse blades 1070 (e.g., 1 ms), the cylinder 1026 and the output shaft 1054 rotate in unison.

Also at this time, hydraulic fluid is discharged through the outlet orifices 1086 at a relatively slow rate determined by the position of the orifice screw 1090, thereby damping the radial inward movement of the pulse blades 1070. Once the ball bearings 1074 have displaced inward by a distance corresponding to the size of the protrusions 1050, the pulse blades 1070 move over the protrusions 1050 and torque is no longer transferred to the output shaft 1054. The camshaft 1038 rotates independently of the output shaft 1054 again after this point, and moves into a position where it no longer seals the inlet orifices 1078 thereby causing fluid to be drawn into the output shaft cavity 1082 and allowing the ball bearings 1074 and pulse blades 1070 to displace radially outward once again. The cycle is then repeated as the cylinder 1026 continues to rotate, with torque transfer occurring twice during each 360 degree revolution of the cylinder. In this manner, the output shaft 1054 receives discrete pulses of torque from the cylinder 1026.

FIGS. 6-11C illustrate another embodiment of a rotary impact mechanism 2000, which may be incorporated into the impact tool 10 (e.g., in place of the impact mechanism 32). Specifically, with reference to FIGS. 6-8, the rotary impact mechanism 2000 includes an anvil 2026, a hammer 2030, and a cylinder 2034. A driven end 2038 of the cylinder 2034 is coupled to the electric motor 18 (FIG. 2) to receive torque therefrom, causing the cylinder 2034 to rotate. The cylinder 2034 at least partially defines a chamber 2042 (FIG. 8) that contains an incompressible fluid (e.g., hydraulic fluid, oil, etc.). The chamber 2042 is sealed and is also partially defined by an end cap 2046 secured to the cylinder 2034. The hydraulic fluid in the chamber 2042 reduces the wear and the noise of the rotary impact mechanism 2000 that is created by impacting the hammer 2030 and the anvil 2026.

Figure 6:
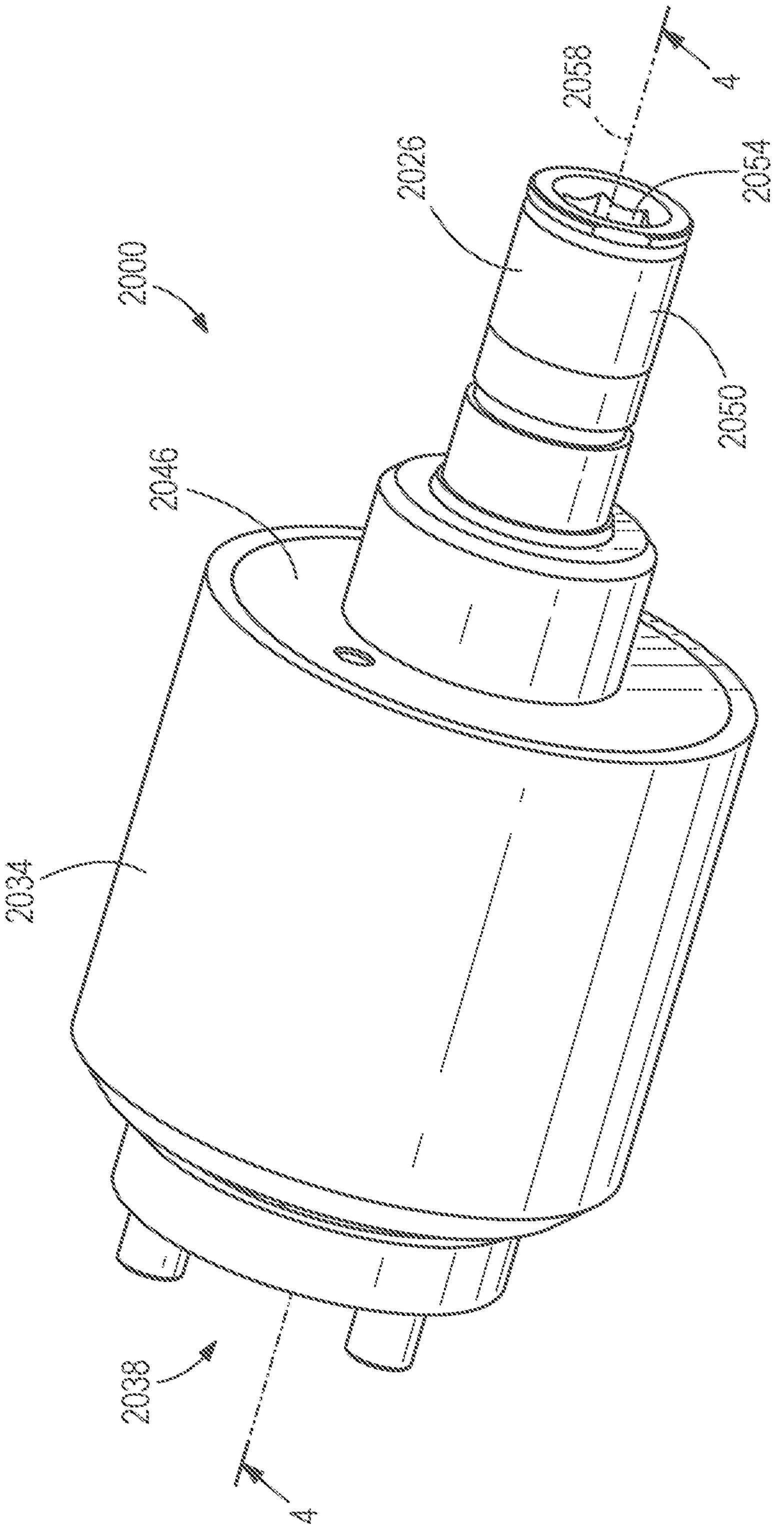
FIG. 6 is a perspective view of another impact mechanism in accordance with another embodiment of the invention.
Figure 7:
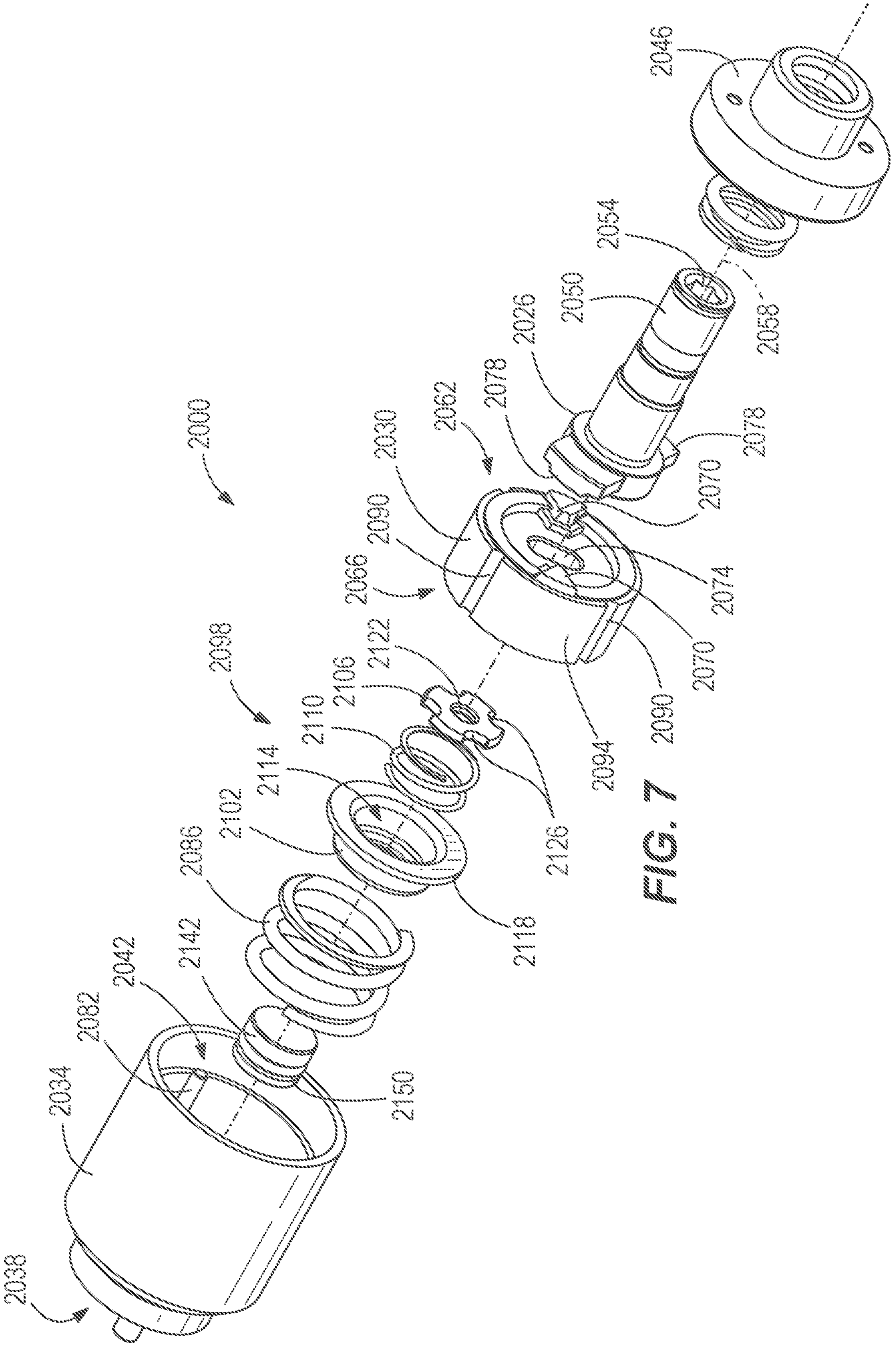
FIG. 7 is an exploded view of the impact mechanism of FIG. 6.
Figure 8:
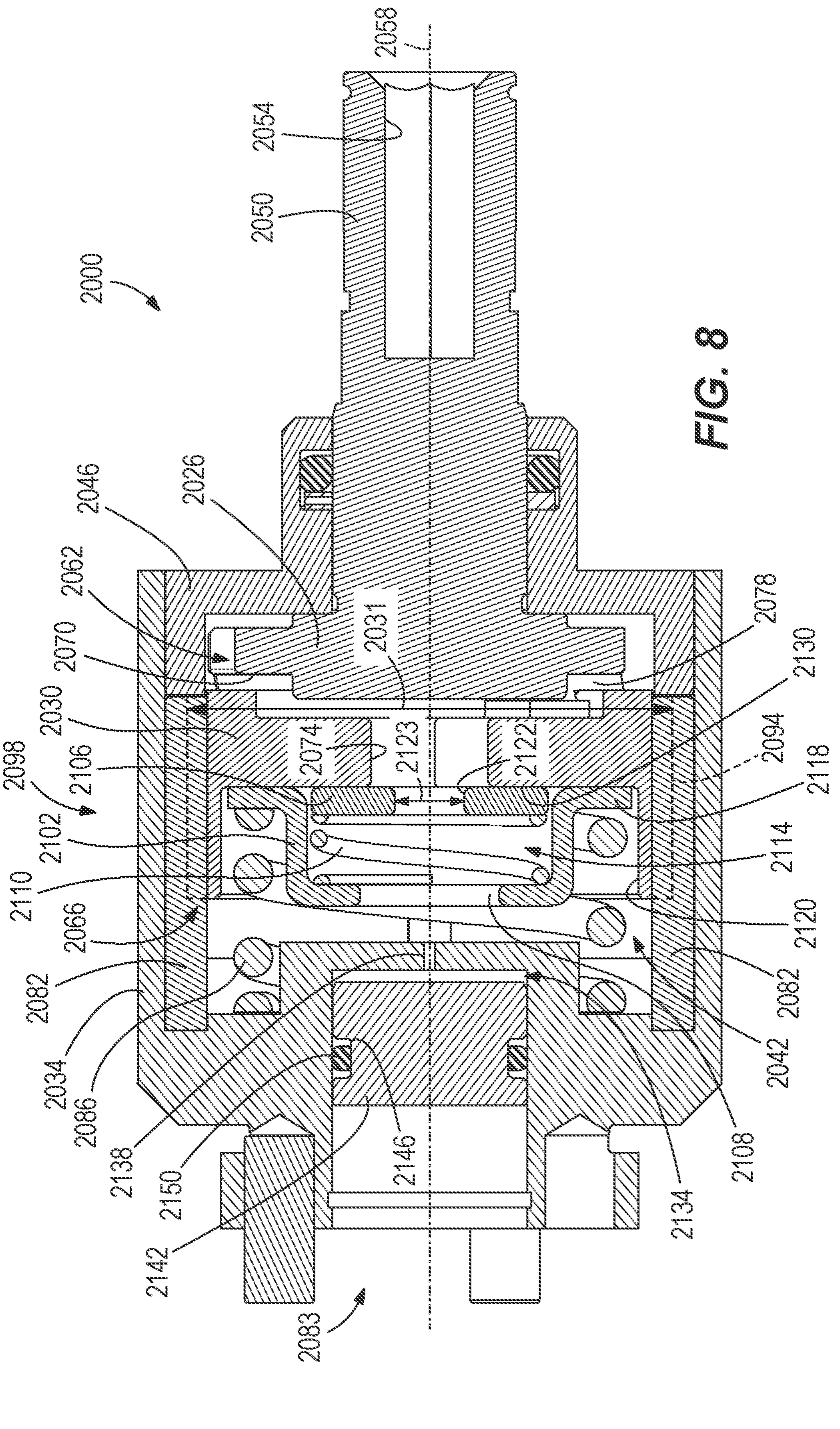
FIG. 8 is a cross-sectional view of the impact mechanism of FIG. 6, taken along section 4-4 in FIG. 6.

With continued reference to FIGS. 6-8, the anvil 2026 is positioned at least partially within the chamber 2042 and includes an output shaft 2050. In the embodiment of FIGS. 6-11C, the output shaft 2050 includes a hexagonal receptacle 2054 therein for receipt of a tool bit. The output shaft 2050 extends from the chamber 2042 and through the end cap 2046. The anvil 2026 rotates about a rotational axis 2058 defined by the output shaft 2050.

With continued reference to FIGS. 6-8, the hammer 2030 is positioned at least partially within the chamber 2042. The hammer 2030 includes a first side 2062 facing the anvil 2026 and a second side 2066 opposite the first side 2062. The hammer 2030 further includes hammer lugs 2070 and a central aperture 2074 extending between the sides 2062, 2066. As discussed in greater detail below, the central aperture 2074 permits the hydraulic fluid in the chamber 2042 to pass through the hammer 2030. The hammer lugs 2070 correspond to lugs 2078 formed on the anvil 2026. The rotational rotary impact mechanism 2000 further includes hammer alignment pins 2082 and a hammer spring 2086 (i.e., a first biasing member) positioned within the chamber 2042. The hammer alignment pins 2082 are coupled to the cylinder 2034 and are received within corresponding grooves 2090 formed on an outer circumferential surface 2094 of the hammer 2030 to rotationally unitize the hammer 2030 to the cylinder 2034 such that the hammer 2030 co-rotates with the cylinder 2034. The pins 2082 also permit the hammer 2030 to axially slide within the cylinder 2034 along the rotational axis 2058. In other words, the hammer alignment pins 2082 slide within the grooves 2090 such that the hammer 2030 is able to translate along the axis 2058 relative to the cylinder 2034. The hammer spring 2086 biases the hammer 2030 toward the anvil 2026.

The impact mechanism 2000 further defines a trip torque, which determines the reactionary torque threshold required on the anvil 2026 before an impact cycle begins. In one embodiment, the trip torque is equal to the sum of the torque due to seal drag, the torque due to the spring 2086, and the torque due to the difference in rotational speed of the hammer 2030 and the anvil 2026. In particular, the seal drag torque is the static friction between the O-ring and the anvil 2026. The spring torque contribution to the total trip torque is based on, among other things, the spring rate of the spring 2086, the height of the lugs 2070, and the coefficient of friction between the anvil lugs 2078 and the hammer lugs 2070. The torque from the difference in rotational speed of the anvil 2026 and the hammer 2030 is included in the torque calculation during impaction only, and has little to no effect on determining the trip torque threshold (i.e., is the damping force of the fluid rapidly moving through the orifice 2122). In some embodiments, the trip torque is within a range between approximately 10 in-lbf and approximately 30 in-lbf. In other embodiments, the trip torque is greater than 20 in-lbf. Increasing the trip torque increases the amount of time the hammer 2030 and the anvil 2026 are co-rotating (i.e., in a continuous drive).

With reference to FIGS. 7 and 8, the rotary impact mechanism 2000 further includes a valve assembly 2098 positioned within the chamber 2042 that allows for various fluid flow rates through the valve assembly 2098. As described in greater detail below, the valve assembly 2098 adjusts the flow of the hydraulic fluid in the chamber 2042 to decrease the amount of time it takes the hammer 2030 to return to the anvil 2026. In other words, the valve assembly 2098 reduces the time it takes to complete a single impact cycle. In particular, the flow rate through the valve assembly 2098 varies as the hammer 2030 translates within the cylinder 2034 along the axis 2058. The valve assembly 2098 includes a valve housing 2102 (e.g., a cupped washer), a valve (e.g., an annular disc 2106), and a spring 2110 (i.e., a second biasing member) positioned between the valve housing 2102 and the disc 2106. The valve housing 2102 includes a rear aperture 2108 and defines a cavity 2114 in which the disc 2106 and the spring 2110 are positioned. The spring 2110 biases the disc 2106 toward the hammer 2030, and the hammer spring 2086 biases the valve housing 2102 toward the hammer 2030. In particular, the valve housing 2102 includes a circumferential flange 2118 against which the spring 2086 is seated to bias the valve housing 2102 toward the hammer 2030. In other words, the valve housing 2102 is at least partially positioned between the spring 2086 and the hammer 2030. With reference to FIG. 8, the hammer 2030 defines a recess 2120 and the valve assembly 2102 is at least partially received with the recess 2120.

With reference to FIG. 7, the disc 2106 includes a central aperture 2122 and at least one auxiliary opening 2126. The aperture 2122 of the disc 2106 is in fluid communication with the aperture 2074 formed in the hammer 2030 (FIG. 8). In the illustrated embodiment, the auxiliary openings 2126 are positioned circumferentially around the aperture 2122 and are formed as grooves in the outer periphery of the disc

2106. In other embodiments, the auxiliary openings may be apertures formed in any location on the disc 2106. In further alternative embodiments, the auxiliary opening may be formed as part of the central aperture 2122 to form one single aperture with less than the entire aperture in fluid communication with the aperture 2074 during at least a portion of operation. In other words, the auxiliary openings may be formed as cutouts or scallops contiguous with the central aperture 2122 that are sometimes blocked and sometimes opened by the hammer 2066 during operation of the impact mechanism 2000.

With continued reference to FIG. 8, the central aperture 2122 defines an orifice diameter 2123 and the hammer 2030 defines a hammer diameter 2031. A ratio R of the hammer diameter 2031 to the orifice diameter 2123 is large and beneficially allows less reliance on tolerances and removes a feature that requires calibration. Additionally, the large ratio R makes leak paths less significant relative to fluid moved by the hammer 2030. Furthermore, the impact tool 2010 has a greater total amount of fluid contained within the rotary impact mechanism 2000. As such, a greater volume of fluid is moved with each stroke of the hammer 2030. In one embodiment, the total fluid in the rotary impact mechanism 2000 is greater than approximately 18,000 cubic mm (18 mL). In another embodiment, the total fluid in the rotary impact mechanism 2000 is greater than approximately 20,000 cubic mm (20 mL). In another embodiment, the total fluid in the rotary impact mechanism 2000 is greater than approximately 22,000 cubic mm (22 mL). Likewise, the amount of fluid moved with each stroke of the hammer 2030 in one embodiment is greater than approximately 1000 cubic mm (1 mL). In another embodiment, the fluid moved with each stroke of the hammer 2030 is greater than approximately 1250 cubic mm (1.25 mL). In another embodiment, the fluid moved with each stroke of the hammer 2030 is approximately 1500 cubic mm (1.5 mL). A greater amount of fluid moved with each stroke of the hammer 2030 results in fluid leak paths having a proportionally smaller effect on the performance of the tool 2010. Additionally, by moving a greater area of fluid, the rotary impact mechanism 2000 experiences less pressure for the same amount of torque.

The disc 2106 is moveable between a first position (FIG. 8) that permits a first hydraulic fluid flow rate in the chamber 2042 from the second side 2066 to the first side 2062 of the hammer 2030, and a second position (FIG. 11B) that permits a second hydraulic fluid flow rate in the chamber 2042 from the first side 2062 to the second side 2066 of the hammer 2030. In the illustrated embodiment, the second fluid flow rate is greater than the first fluid flow rate, and the disc 2106 is in the second position (FIG. 11B) when the hammer 2030 moves along the axis 2058 toward the anvil 2026. In particular, the hammer 2030 defines a rear surface 2130 on the second side 2066 and the disc 2106 engages the rear surface 2130 when the disc 2106 is in the first position (FIG. 8). In contrast, the disc 2106 is spaced from the rear surface 2130 when the disc 2106 is in the second position (FIG. 11B).

With reference to FIGS. 7 and 8, when the disc 2106 is in the first position, the hydraulic fluid flows through the central aperture 2122 but does not flow through the auxiliary openings 2126. In other words, when the valve assembly 2098 is in a closed state (FIG. 8), the spring 2110 biases the disc 2106 against the hammer 2030, blocking the auxiliary openings 2126 with the rear surface 2130 while the central opening 2122 remains in fluid communication with the aperture 2074 formed in the hammer 2030 (FIG. 8). When the disc 2106 is in the second position, the hydraulic fluid flows through the central aperture 2122 and the auxiliary openings 2126. In other words, when the valve assembly 2098 is in an open state (FIG. 11B), the disc 2106 separates from the hammer 2030, which unblocks the auxiliary openings 2126 and places the auxiliary openings 2126 in fluid communication with the central aperture 2074 of the hammer 2030. As a result, the valve assembly 2098 provides an increased hydraulic fluid flow rate in one direction, which allows faster fluid pressure equalization when the hammer 2030 is translating along the axis 2058 toward the anvil 2026.

With continued reference to FIGS. 7 and 8, the impact tool 2010 further includes an expansion chamber 2134 defined in the cylinder 2034. The expansion chamber 2134 contains the hydraulic fluid and is in fluid communication with the chamber 2042 by a passageway 2138 (e.g., a pin hole) formed within the cylinder 2034. A plug 2142 is positioned within the expansion chamber 2134 and is configured to translate within the expansion chamber 2134 to vary a volume of the expansion chamber 2134. In other words, the plug 2142 moves with respect to the cylinder 2134 to vary the volume of the expansion chamber 2134. The size of the passageway 2138 is minimized to restrict flow between the expansion chamber 2134 and the chamber 2142 and to negate the risk of large pressure developments over a short period of time, which may otherwise cause significant fluid flow into the expansion chamber 2134. In some embodiments, the diameter of the passageway 2138 is within a range between approximately 0.4 mm and approximately 0.6 mm. In further embodiments, the diameter of the passageway 2138 is approximately 0.5 mm. In the illustrated embodiment, the plug 2142 includes an annular groove 2146 and an O-ring 2150 positioned within the annular groove 2146. The O-ring 2150 seals the sliding interface between the plug 2142 and the expansion chamber 2134. As such, the plug 2142 moves axially within the expansion chamber 2134 to accommodate changes in temperature and/or pressure resulting in the expansion or contraction of the fluid within the sealed rotational rotary impact mechanism 2000. As such, a bladder or the like compressible member is not required in the cylinder 2034 to accommodate pressure changes.

Over extended periods of use, the output torque of the rotary impact mechanism 2000 may degrade because the fluid within the sealed rotational rotary impact mechanism 2000 generates heat and as the temperature increases, the fluid viscosity changes. A fluid with a higher viscosity index (VI) is utilized to reduce the change in viscosity due to changes in temperature, thereby providing more consistent performance. In one embodiment, the fluid viscosity index is greater than approximately 2035. In another embodiment, the fluid viscosity index is greater than approximately 2080. In another embodiment, the fluid viscosity index is within a range between approximately 2080 and approximately 2110. In the embodiment of the impact mechanism 2000, the impact tool 10 includes a temperature sensor that senses the temperature of the fluid within the rotary impact mechanism 2000 and communicates the fluid temperature to a controller. The controller is configured to then electrically compensate for changing fluid temperature in order to output consistent torque at different temperatures.

During operation of the impact mechanism 2000, the hammer 2030 and the cylinder 2034 rotate together and the hammer lugs 2070 rotationally impact the corresponding anvil lugs 2078 to impart consecutive rotational impacts to the anvil 2026 and the output shaft 2050. When the anvil 2026 stalls, the hammer lugs 2070 ramp over and past the anvil lugs 2078, causing the hammer 2030 to translate away from the anvil 2026 against the bias of the hammer spring 2086.

Figure 9:
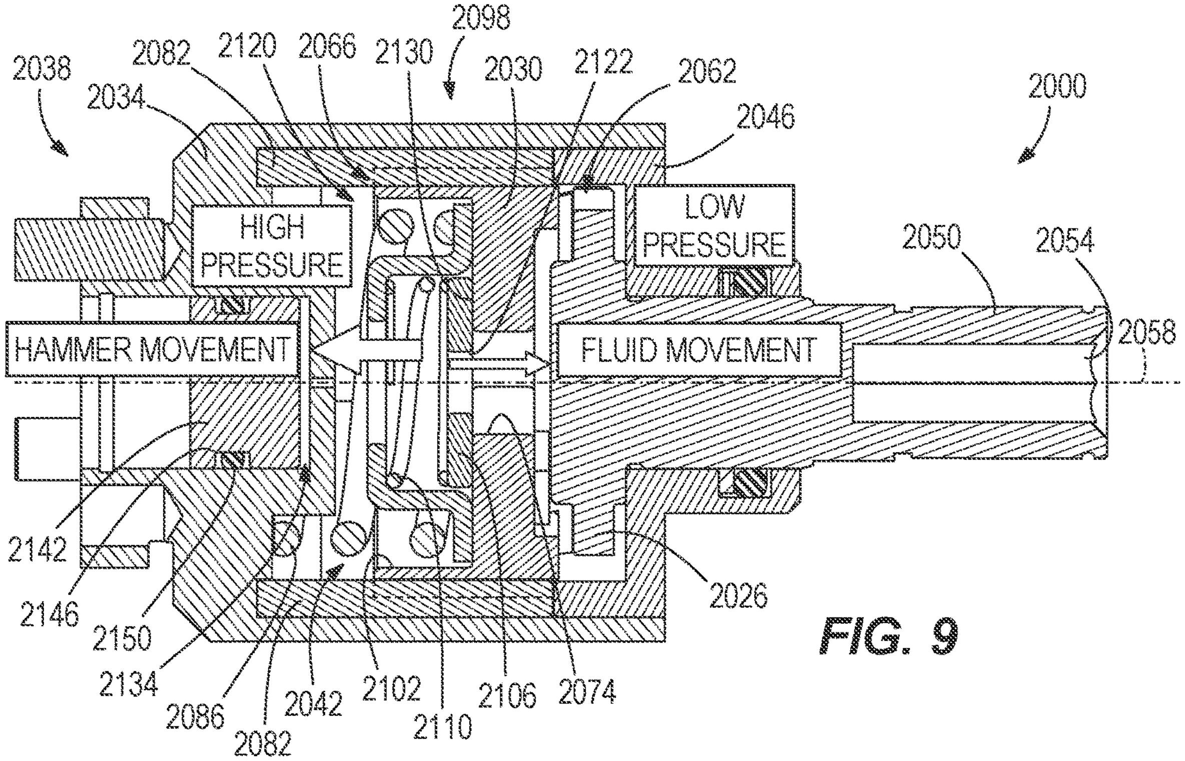
FIG. 9 is a cross-sectional view of the impact mechanism of FIG. 6, illustrating an overview of a retraction phase.
Figure 10A:
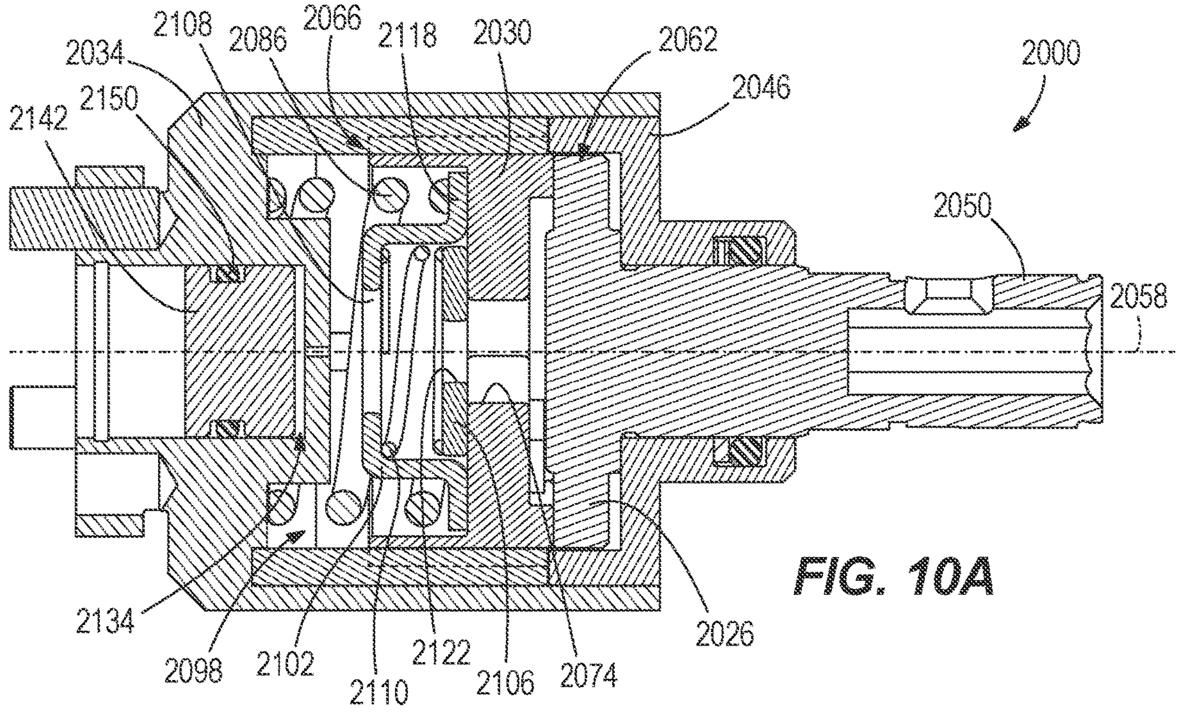
FIGS. 10A-10C are cross-sectional views of the impact mechanism of FIG. 6, illustrating operation of the retraction phase.
Figure 10B:
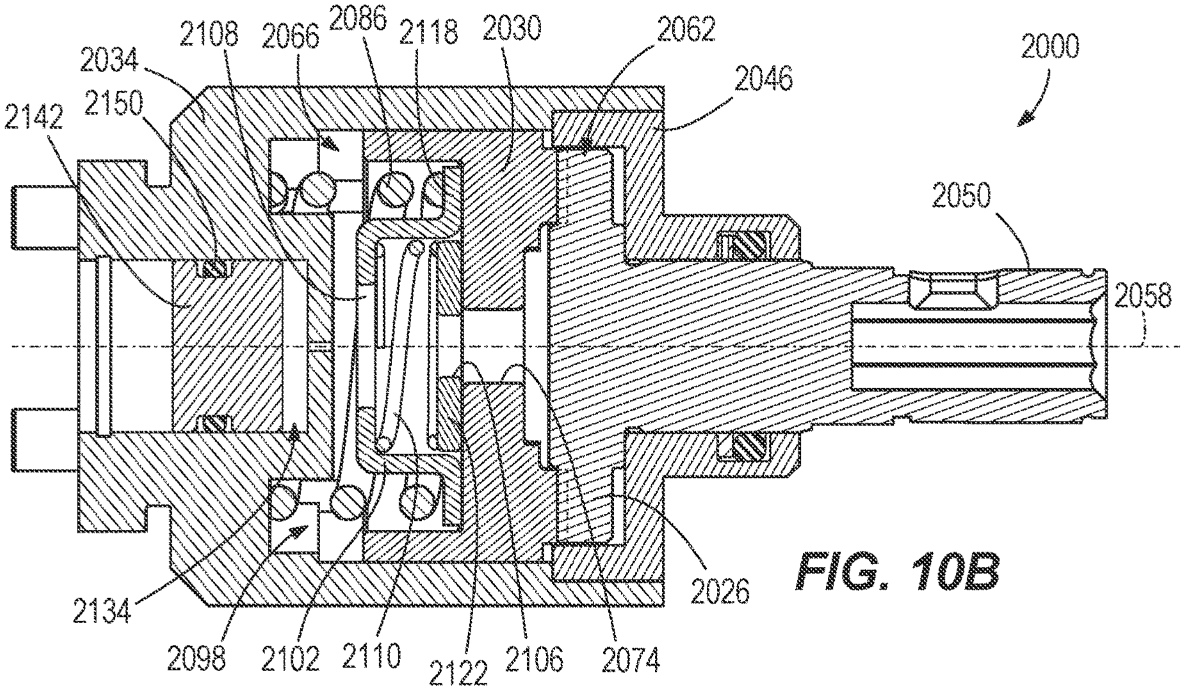
Figure 10C:
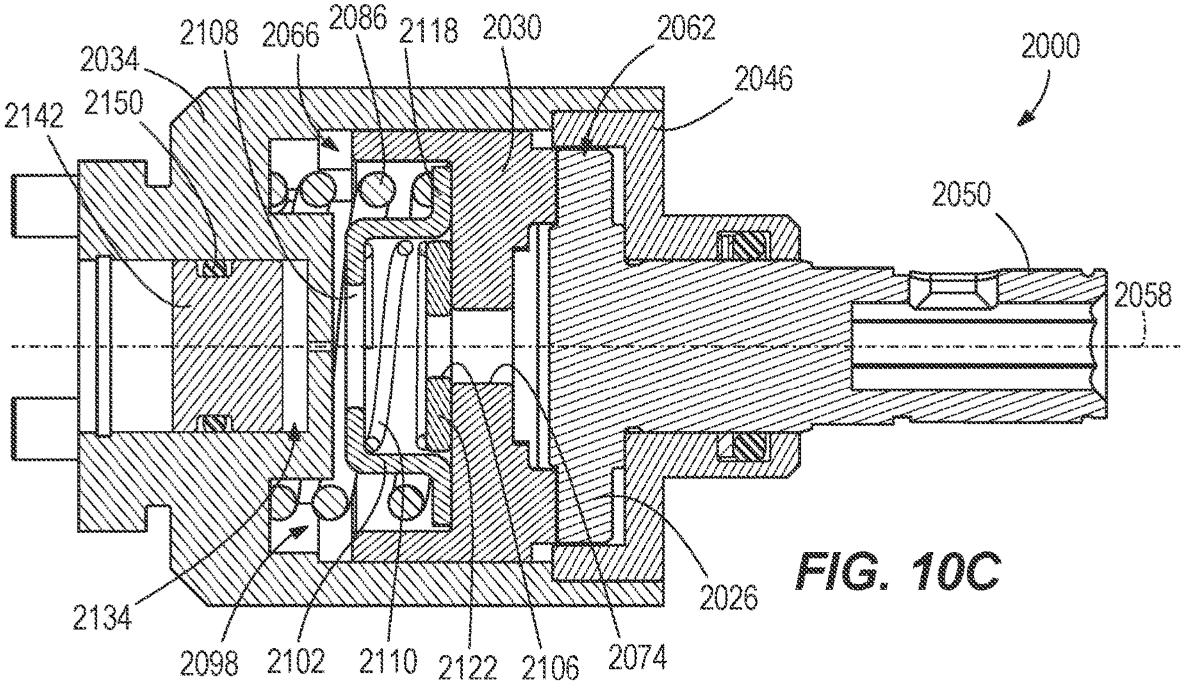

FIG. 9 illustrates an overview of a hammer retraction phase, and FIGS. 10A-10C illustrate step-wise operation of the retraction phase. FIG. 10A illustrates the rotary impact mechanism 2000 when the hammer lugs 2070 first contact the anvil lugs 2078. FIG. 10B illustrates the rotary impact mechanism 2000 when the hammer 2030 begins to translate away from the anvil 2026. As the hammer 2030 moves away from the anvil 2026, the hydraulic fluid in the chamber 2042 on the first side 2062 of the hammer 2030 is at a low pressure while the hydraulic fluid in the chamber 2042 on the second side 2066 of the hammer 2030 is at a high pressure (FIG. 9). In addition, the valve assembly 2098 translates with the hammer 2030, away from the anvil 2026. The hydraulic fluid flows from the second side 2066 to the first side 2062 by traveling through the central aperture 2122 of the disc 2106 and the hammer aperture 2074. At the end of the retraction phase (FIG. 10C), the hammer spring 2086 is compressed and the hammer lugs 2070 have almost rotationally cleared the anvil lugs 2078.

Figure 11A:
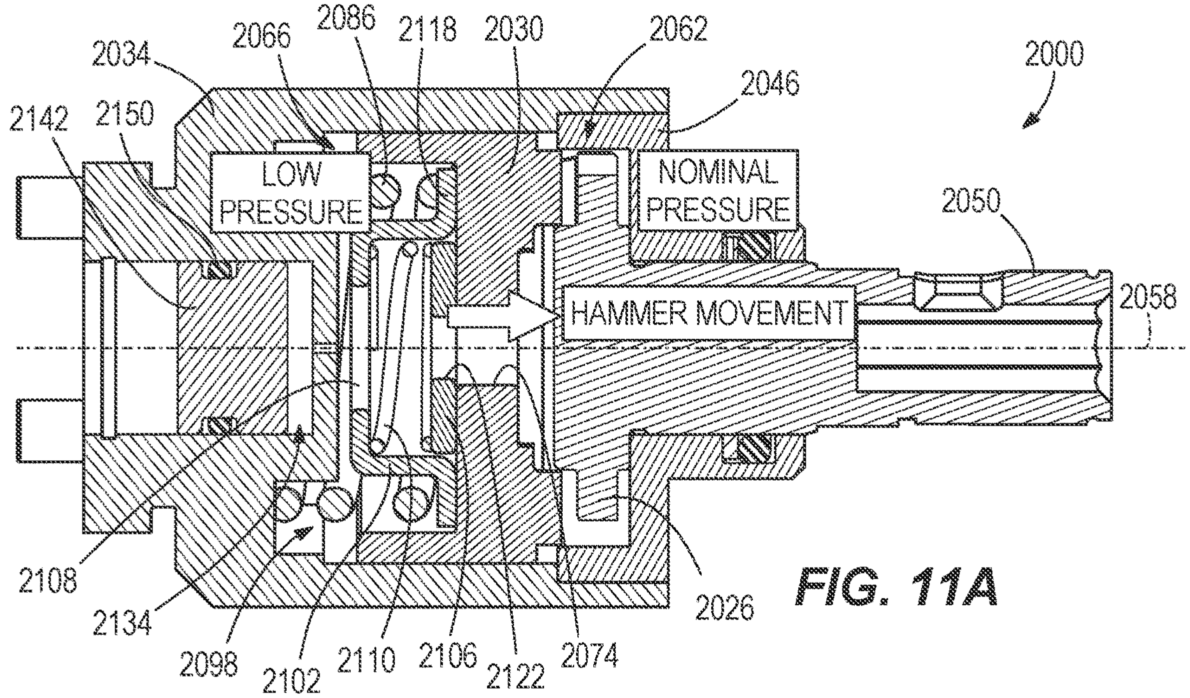
FIGS. 11A-11C are cross-sectional views of the impact mechanism of FIG. 6, illustrating operation of a return phase.
Figure 11B:
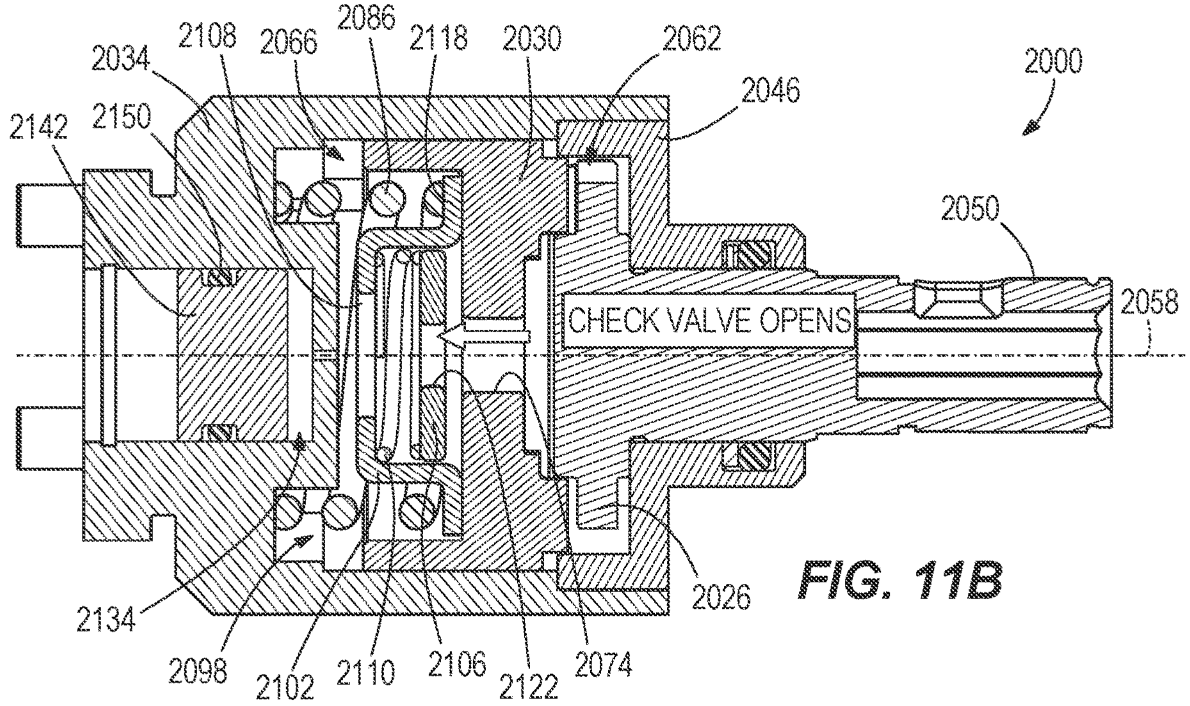
Figure 11C:
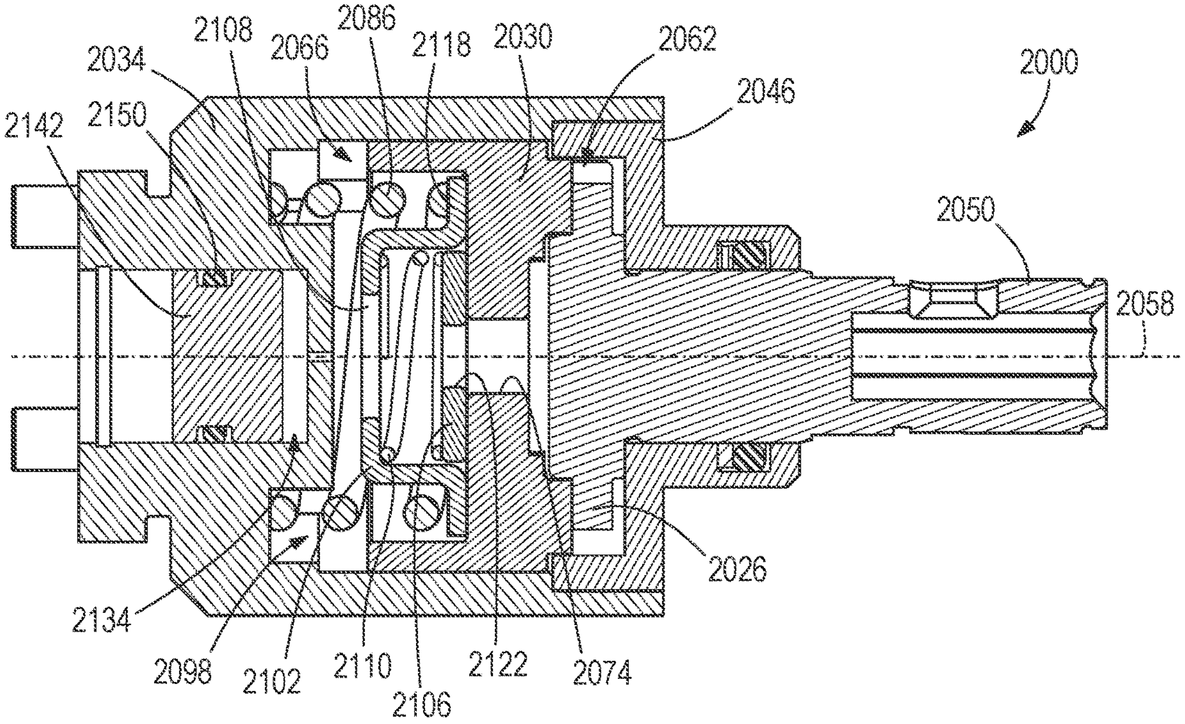

Once the hammer lugs 2070 rotationally clear the anvil lugs 2078, the spring 2086 biases the hammer 2030 back towards the anvil 2026 in a hammer return phase (FIG. 11A-11C). FIG. 11A illustrates the rotary impact mechanism 2000 when the hammer 2030 begins to translate toward the anvil 2026. As the hammer 2030 moves toward the anvil 2026, the hydraulic fluid in the chamber 2042 on the first side of the hammer 2030 is at a nominal pressure while the hydraulic fluid in the chamber 2042 on the second side 2066 of the hammer 2030 is at a low pressure (FIG. 11A). FIG. 11B illustrates the rotary impact mechanism 2000 with the valve assembly 2098 in the open state as the hammer 2030 translates toward the anvil 2026. The hammer spring 2086 keeps the flange 2118 of the valve housing 2102 in contact with the rear surface 2130 of the hammer 2030 as the disc 2106 separates from the rear surface 2130 due to the pressure differential between the two sides 2062, 2066 of the hammer 2030.

With the valve disc 2106 unseated from the hammer 2030, the auxiliary openings 2126 are placed in fluid communication with the hammer aperture 2074, thereby providing for additional fluid flow through the valve assembly 2098. In other words, the disc 2106 deflects away from the hammer 2030 as the hammer 2030 is returning toward the anvil 2026, which creates additional fluid flow through the valve assembly 2098. Once the hammer 2030 has axially returned to the anvil 2026, the valve assembly 2098 returns to the closed state (FIG. 11C), and the impact assembly is ready to begin another impact and hammer retraction phase. In other words, when the hammer 2030 has returned, the pressure on both sides 2062, 2066 of the hammer 2030 has equalized and the disc 2106 is re-seated against the rear surface 2130 of the hammer 2030 by the bias of the valve spring 2110. As such, the valve assembly 2098 provides for additional fluid flow through the valve assembly 2098 when the hammer 2030 is returning toward the anvil 2026 in order to more quickly reset the hammer 2030 for the next impact cycle. In other words, the valve assembly 2098 reduces the amount of time it takes to complete an impact cycle.

Figure 12:
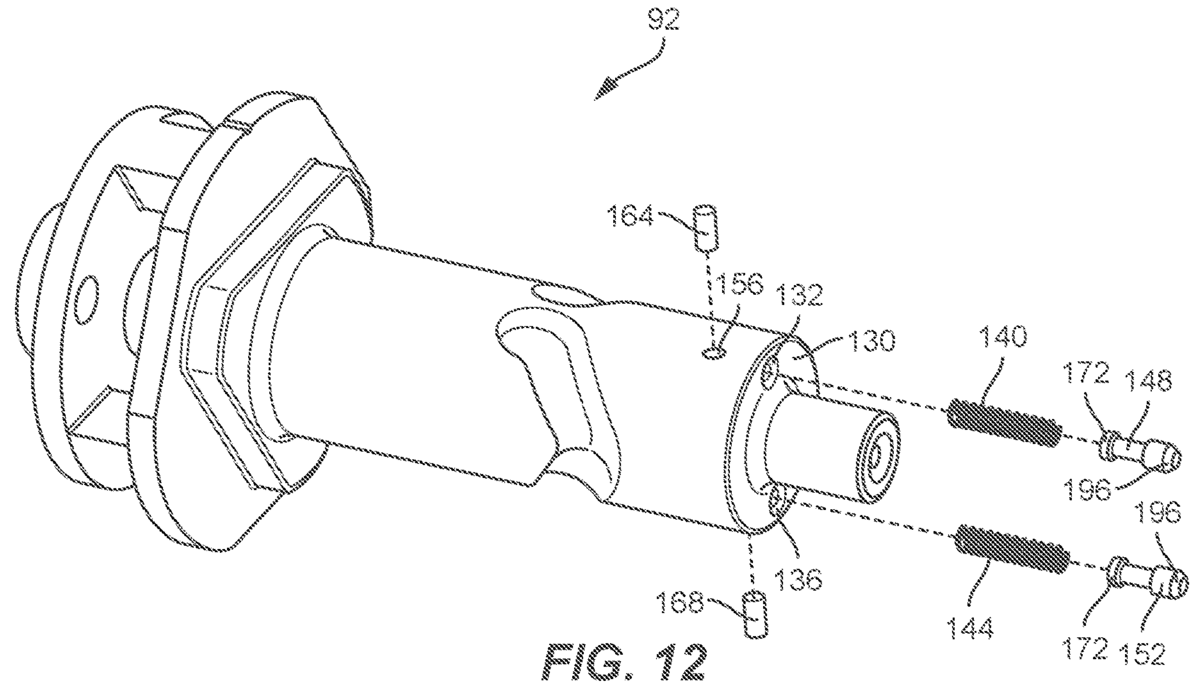
FIG. 12 is an exploded view of a camshaft in accordance with another embodiment of the invention, for use with a rotary impact driver such as the impact driver of FIG. 1.
Figure 13:
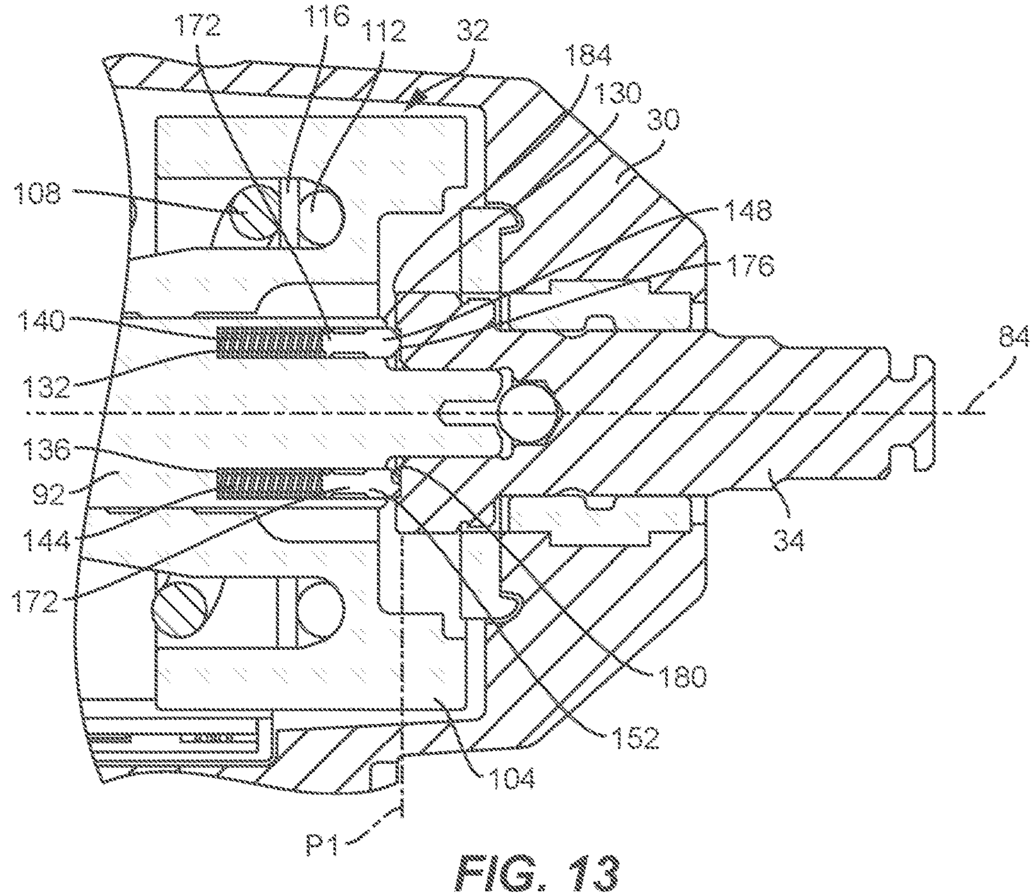
FIG. 13 is an enlarged cross-sectional view of the rotary impact driver of FIG. 12.

FIGS. 12-20 illustrate another embodiment of the impact mechanism 32, with certain modifications and differences explained below. With reference to FIGS. 12 and 13, a forward face 130 of the camshaft 92 includes first and second longitudinal bores 132, 136 that extend parallel to the axis 84. First and second springs 140, 144 are respectively seated within the first and second bores 132, 136. First and second biasing pins 148, 152 are also respectively arranged in the first and second bores 132, 136 and biased outwardly from the first and second bores 132, 136 respectively by the springs 140, 144. The camshaft 92 also includes a first radial bore 156 (FIG. 12) and a second radial bore (not shown, located opposite the first radial bore 156), which respectively receive first and second cross pins 164, 168. The first and second cross pins 164, 168 inhibit the first and second biasing pins 148, 152 from being pushed completely out of the first and second bores 132, 136 by blocking a flared end 172 on each of the first and second pins 148, 152. Thus, engagement between the cross pins 164, 168 and the flared ends 172 of the pins 148, 152 retains the pins 148, 152 within the longitudinal bores 132, 136 against the biasing forces of the springs 140, 144

Figure 14:
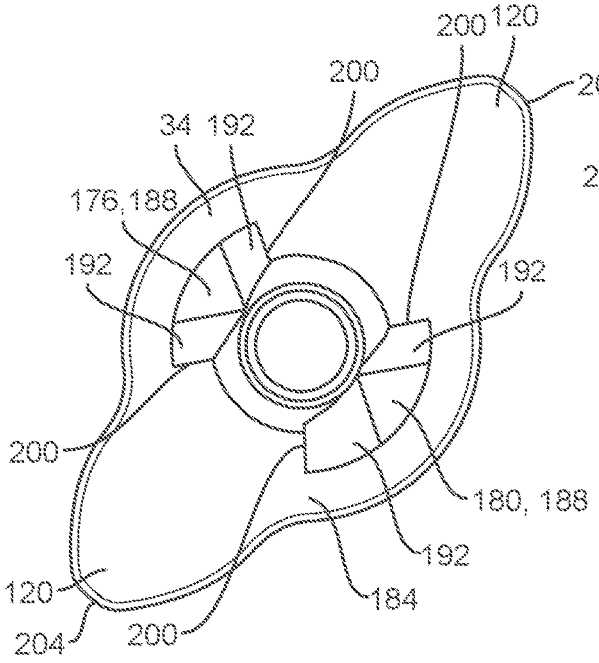
FIG. 14 is a plan view of an anvil of the rotary impact driver of FIG. 12.
Figure 15:
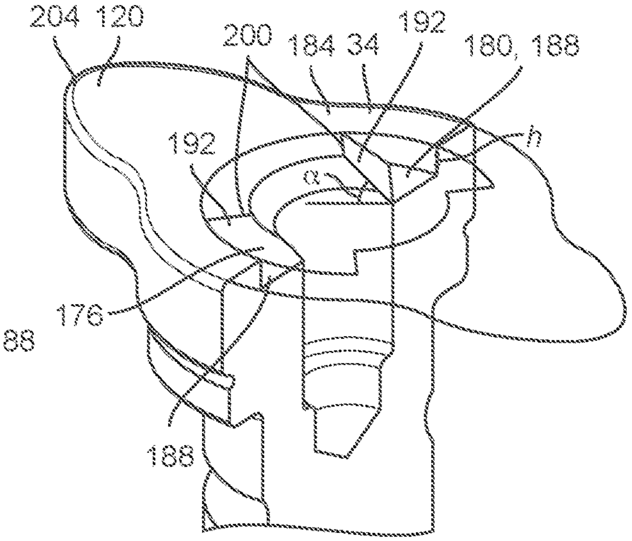
FIG. 15 is a partial cross-sectional view of the anvil of FIG. 14.
Figure 16:
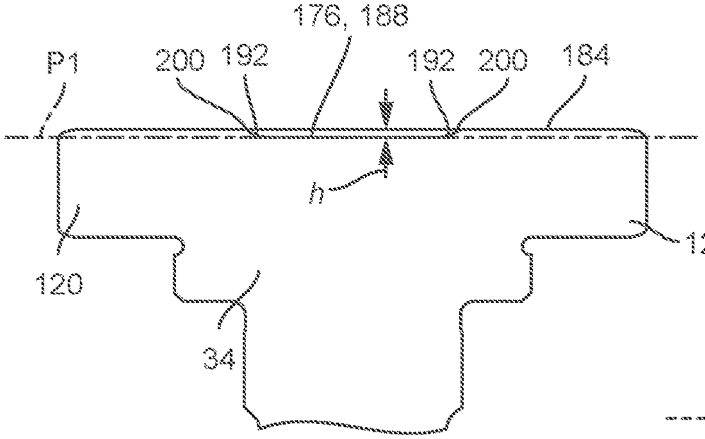
FIG. 16 is a cross-sectional view of the anvil of FIG. 14.
Figure 17:
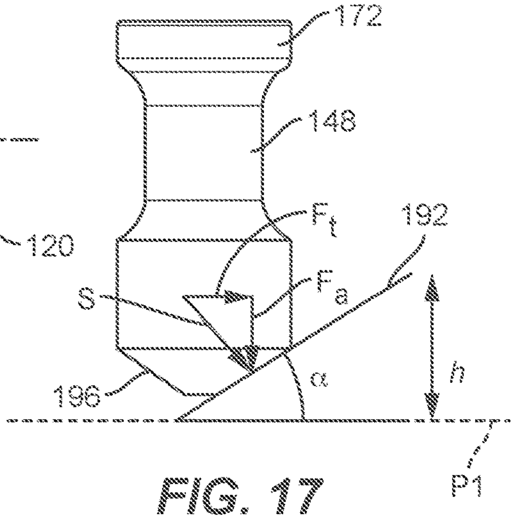
FIG. 17 is a plan view of a pin of the camshaft of FIG. 12 engaged against an angled surface of the anvil of FIG. 14.

Referring to FIGS. 14-16, in the illustrated embodiment, first and second grooves 176, 180 are formed in a rear face 184 of the anvil 34. Each of the first and second grooves 176, 180 has a flat surface 188 that is parallel to the rear face 184 and defines a plane P1, as shown in FIG. 16. Each of the first and second grooves 176, 180 also has a pair of inclined surfaces 192 respectively arranged on opposite sides of the flat surface 188. The inclined surfaces 192 each define an angle α with respect to the plane P1 (FIG. 15). As shown in FIG. 17, each of the first and second biasing pins 148, 152 includes a frustoconical surface 196 opposite the flared end 172. In the illustrated embodiment, the frustoconical surface 196 tapers at the same angle α with respect to the plane P1.

The frustoconical surface 196 is configured to engage with the inclined surfaces 192 of the first and second grooves 176, 180. Specifically, because the first and second biasing pins 148, 152 are biased by the first and second springs 140, 144, an applied force S imparted by the first and second springs 140, 144 is transferred through the frustoconical surface 196 to the inclined surfaces 192 of the first and second grooves 176, 180. As shown in FIG. 17, the applied force S can be resolved into a tangential force $F_t$ oriented perpendicular to the axis 84 and an axial force $F_a$ that is parallel with the axis 84. The tangential force $F_t$ imparts a moment on the anvil 34 in the working rotational direction, i.e., the same direction that the hammer 104 is rotating to impart rotational impacts on the anvil 34. A height h (FIG. 16) is defined between the flat surface 188 (and the plane P1) and the rear face 184. The height h, as well as the angle α, can be increased or decreased depending on the desired magnitude of the tangential force $F_t$ desired for the application.

Figure 2B:
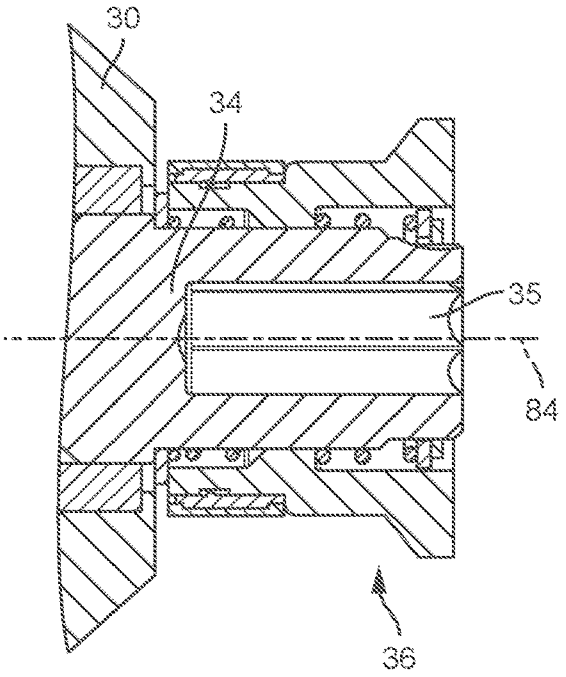
FIG. 2B is a partial cross-sectional view of an impact driver according to another embodiment of the invention.

In contrast to the embodiment of FIGS. 1-2B, the anvil 34 of the embodiment of FIGS. 12-20 is rotationally biased such that the socket or bit that it retains is rotationally biased in the "working direction", such as a loosening or tightening direction for a fastener. As the camshaft 92 rotates in the working direction, the first and second pins 148, 152 rotate therewith, thus repeatedly moving in and out of the first and second grooves 176, 180.

In more detail, the first and second pins 148, 152 move, in the rotational direction, down a leading inclined surface 192, along the flat surface 180, and up a trailing inclined surface 192. As the first and second pins 148, 152 respectively move up the trailing inclined surfaces 192 on their way out of the first and second grooves 176, 180, the first and second pins 148, 152 impart the tangential force $F_t$ that biases the anvil 34 in the working rotational direction. Thus, after the hammer 104 rotationally impacts the anvil 34 in the working rotational direction, a moment is applied to the anvil 34 in the same working rotational direction, thus reducing any angular recoil or rebound experienced by the anvil 34 after impact in a direction opposite the working rotational direction. This, in turn, reduces the angular displacement of the anvil 34 that is required to make up for the recoil prior to the next impact imparted to a fastener (via a socket or bit). This also reduces the number of intermediate impacts or collisions within the impact mechanism 32 between rotational impacts transmitted to a fastener (e.g., an intermediate impact between the hammer 104 and anvil 34 to stop recoil and resume rotation of the anvil 34 in the working rotational direction), which reduces the amount of energy required to rotate the anvil 34 during a fastener driving process.

In contrast, in typical impact mechanisms in which the anvil is not rotationally biased, after each impact by the hammer upon the anvil, the anvil may tend to rebound or recoil in an opposite rotational direction to the working rotational direction, in response to transferring the rotational impact to the fastener (via the socket or bit). Thus, prior to the hammer delivering the next rotational impact to the anvil, the anvil must first be rotated by the same angular displacement as the recoil in the working rotational direction before transferring another rotational impact to the fastener (via the socket or bit). This "rebounding" effect is undesirable, as it can cause intermediate collisions that decrease the rotational impact energy that is ultimately transferred to the fastener.

The embodiment of FIGS. 12-20 advantageously increases a maximum level of attainable torque, increases the speed at which the maximum level of torque is reached, increases the consistency of the torque, and provides an improved means by which the torque on a fastener may be estimated. The impact mechanism 32 according to the embodiment of FIGS. 12-20 also increases torque efficiency and operational consistency, and reduces vibration, noise, and operation time. The embodiment of FIGS. 12-20 is particularly useful for applications requiring a fastener to be driven quickly, such as lag bolts and deck screws.

Also, because there are two inclined surfaces 192 respectively arranged on opposite sides of the flat surface 188 of each of the first and second grooves 176, 180, the combination of the pins 148, 152 and grooves 176, 180 are operable to impart a moment to the anvil 34 in the working rotational direction regardless of whether the tool 10 is being used to tighten or loosen a fastener. In other words, which of the inclined surfaces 192 of the first and second grooves 176, 180 considered to be the "trailing" inclined surfaces 192 that are engaged by the first and second pins 148, 152 to bias the anvil 34 in the working rotational direction switches depending on the direction that the camshaft 92 and hammer 104 are rotating. Thus, the bias applied by the first and second pins 148, 158 is always in the working rotational direction, such that a combination of the first and second pins 148, 152, the spring 140, 144, and the grooves 176, 180 function as a biasing means to bias the anvil 34 in the working rotational direction in the embodiment of FIGS. 12-20.

Figure 17A:
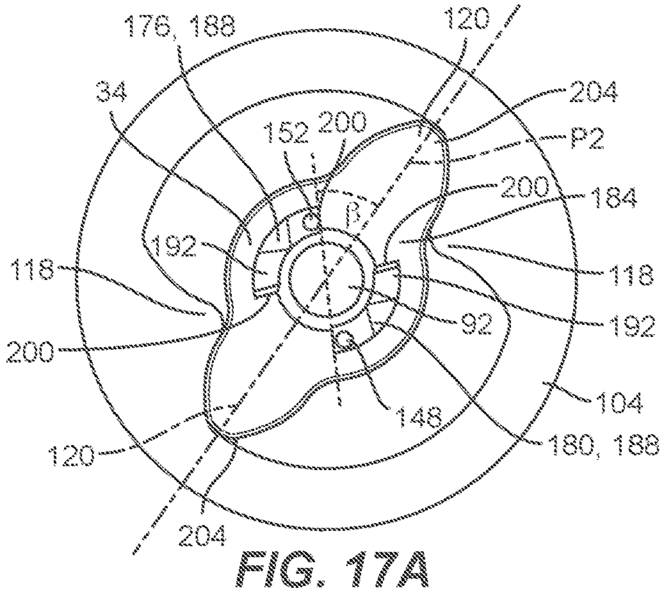
FIG. 17A is a plan view of the anvil of FIG. 14 and a hammer of the rotary impact tool of FIG. 12.
Figure 18:
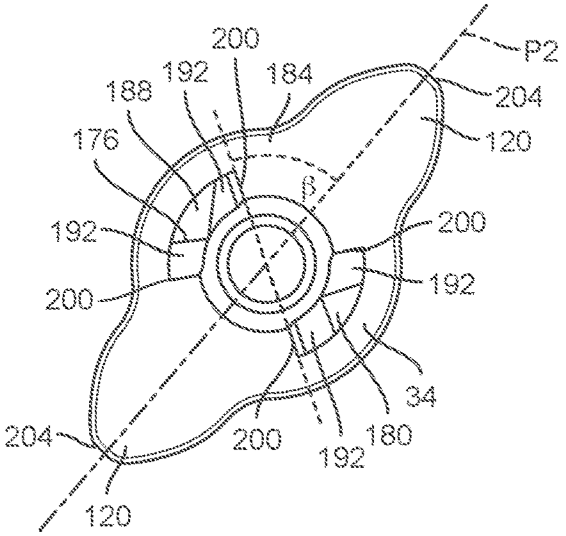
FIGS. 18-20 are plan views of the anvil of FIG. 14, according to different embodiments of the invention.
Figure 19:
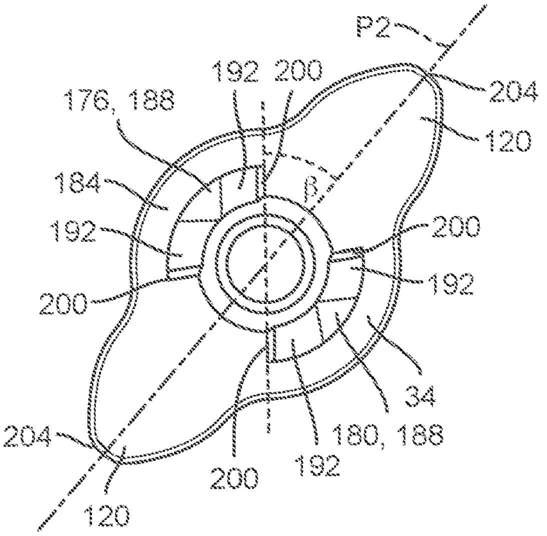
Figure 20:
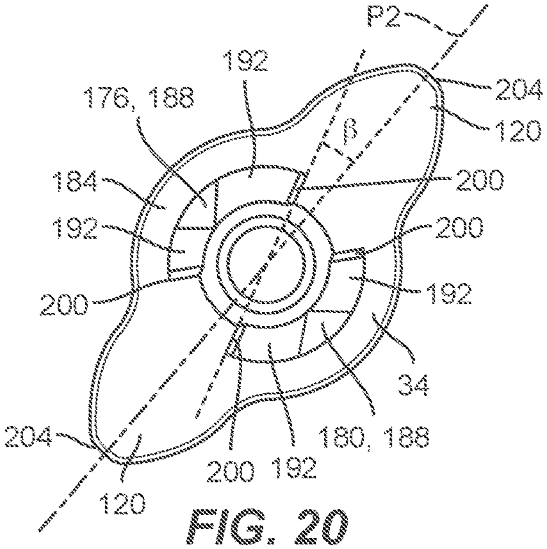

FIG. 17A illustrates that the first and second grooves 176, 180 each include a boundary edge 200 at the end of one of the inclined surfaces 192 where the inclined surfaces 192 transition to the rear face 184 of the anvil 34. The boundary edges 200 each define an angle β with respect to a plane P2 that bisects an apex 204 of the anvil lugs 120. As shown in FIGS. 18-20, the angle β can be increased or decreased depending on the desired application, in a range between 10 and 70 degrees. In some embodiments, the inclined surfaces 192 may be formed as smooth curves to provide a more gradual transition between the inclined surfaces 192 and the rear face 184 of the anvil 34. In some embodiments, the inclined surfaces 192 may each include multiple adjacent surfaces oriented at different angles.

Figure 21:
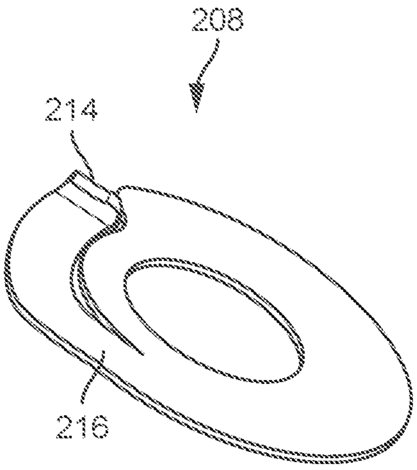
FIG. 21 is a perspective view of a single leaf spring member.
Figure 22:
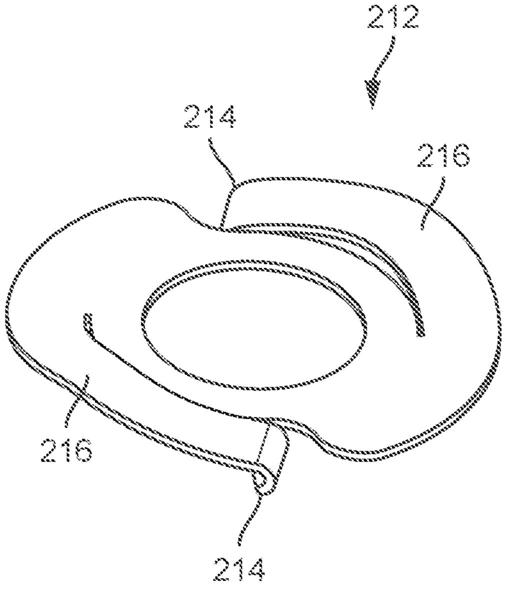
FIG. 22 is a perspective view of a dual leaf spring member.

In some embodiments, the first and second bores 132, 136, first and second springs 140, 144, and first and second biasing pins 148, 152 are omitted, and instead, a single leaf spring washer 208 (FIG. 21) or a dual leaf spring washer 212 (FIG. 22) is arranged at the forward face 130 of the camshaft 92. In such embodiments, distal ends 214 of corresponding leaf springs 216 integrated with the washers 208, 212 are configured to engage with the inclined surfaces 192 to thereby bias the anvil 34 in the working rotational direction in the same manner as the pins 148, 152, such that each of the washers 208, 212 functions as a biasing means to bias the anvil 34 in the working rotational direction in the embodiments of FIGS. 21 and 22. The washers 208, 212 can be made from metal or a plastic material, depending on application. In some embodiments (not shown), the first and second grooves 176, 180 on the rear face 184 of the anvil 34 are omitted and the anvil 34 is rotationally biased in the working direction due to friction. In some embodiments, this friction could develop between the first and second pins 148, 152 engaged against the rear face 184 of the anvil 34, by the washers 208, 212, a bevel washer, or a compressible washer. In some embodiments (not shown) a spring-like component may be arranged in the anvil 34 to engage against the camshaft 92, such that the anvil 34 is rotationally biased in the working direction. In some embodiments a spring may be coupled to either the anvil 34 or camshaft 92 to bias the anvil 34 in a working rotational direction. In some embodiments, the spring may include a coarsely serrated disc spring or a wave spring that engages against inclined surfaces on the anvil 34 and/or camshaft 92 to increase torque transfer.

Figure 23:
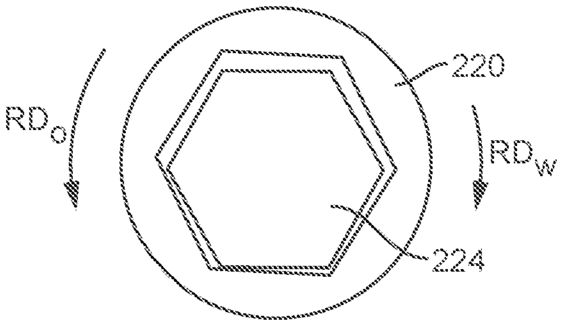
FIG. 23 is a cross-sectional view of a socket arranged on a nut, with no bias applied to the socket.

FIG. 23 is a schematic illustration of a socket 220 and fastener 224 that may be coupled to the anvil 34, where the anvil 34 (and thus the socket 220) are not biased in the working rotational direction $RD_W$. As a result, after the anvil 34 and socket 220 rotationally impact the fastener 224 in the working rotational direction $RD_W$, a reaction force is exerted on the socket 220, imparting a moment to the socket 220 in an opposite rotational direction RDo, thus causing the socket 220 (and the attached anvil 34) to rebound or recoil relative to the fastener 224. As explained above, prior to the next impact, the anvil 34 must be rotated by the same angular distance as the recoil before the socket 220 re-engages the fastener 224 to transfer torque.

Figure 24:
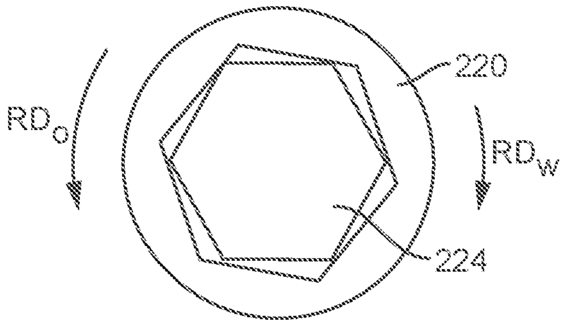
FIG. 24 is a cross-sectional view of a socket arranged on a nut, with bias applied to the anvil.

In contrast, FIG. 24 schematically illustrates a socket 220 and fastener 224 that may be coupled to the anvil 34, where the anvil 34 (and thus the socket) are biased in the working rotational direction $RD_W$, as described above according to embodiments of the present disclosure. Due to the biasing force, the socket 220 is already moved to its rotational limit on the fastener 224 prior to the hammer 104 impacting the anvil 34. As a result, during operation, when the hammer 104 impacts the anvil 34 and the anvil 34 transfers torque to the socket 220, the transfer of torque from the socket 220 to the faster 224 is greater, faster, and more consistent than in the case of FIG. 23, where no biasing means is provided.

In some embodiments, the anvil 34 is biased in the working rotational direction by a frictional coupling, which functions as a biasing means to bias the anvil 34 in the working rotational direction. In some embodiments, this frictional coupling is accomplished via springs and/or compressible components. Alternatively, a centripetal governor could be used.

In some embodiments, the anvil 34 is biased in the working rotational direction by including a viscous region between the anvil 34 and the camshaft 92, such that the viscous region functions as a biasing means to bias the anvil 34 in the working rotational direction. This viscous region could be accomplished by the anvil 34 having a protrusion that extends into the camshaft 92, the camshaft 92 having a protrusion that extends into the anvil 34, or additional components that transfer viscous forces to one or both of the anvil 34 and camshaft 92

In some embodiments, the anvil 34 is biased in the working rotational direction by a magnet that uses eddy currents to provide torque from the camshaft 92 to the anvil, such that the magnet functions as a biasing means to bias the anvil 34 in the working rotational direction. This magnet could be arranged on either of the anvil 34 or the camshaft 92. Alternatively, windings could be used.

FIGS. 25-30 schematically illustrate alternate embodiments that can be used to bias the anvil 34 in the working rotational direction.

Figure 25:
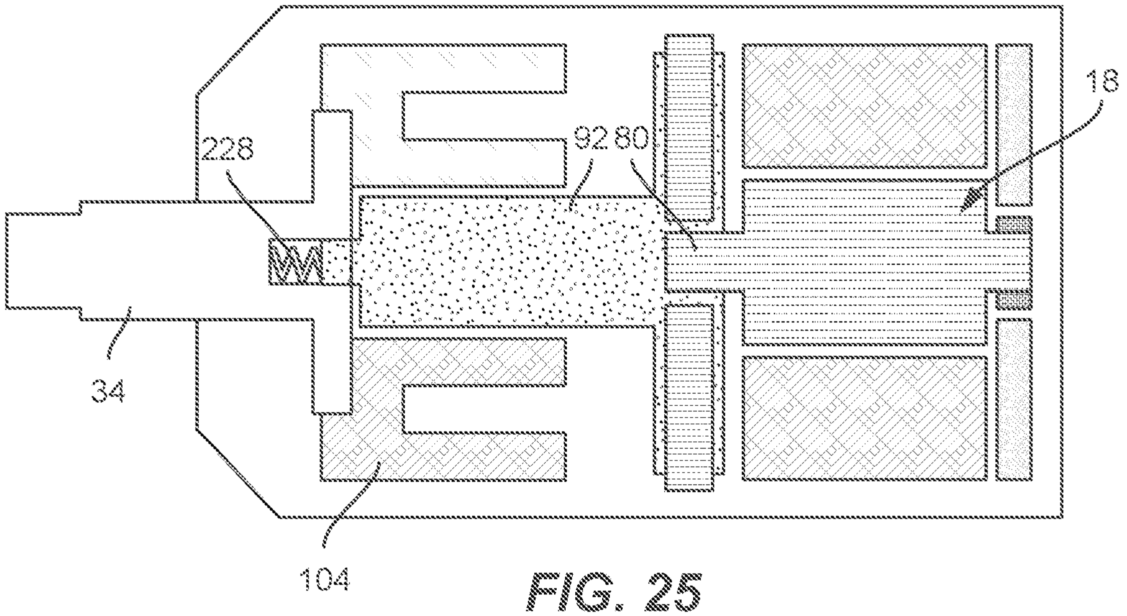
FIG. 25 is a schematic cross-sectional view of a rotary impact tool, according to another embodiment of the invention.

As shown in FIG. 25, a single spring (such as a coil spring) 228 is arranged between the camshaft 92 and the anvil 34 in order to bias the anvil 34 in the working rotational direction, such that the coil spring 228 functions as a biasing means to bias the anvil 34 in the working rotational direction.

Figure 26:
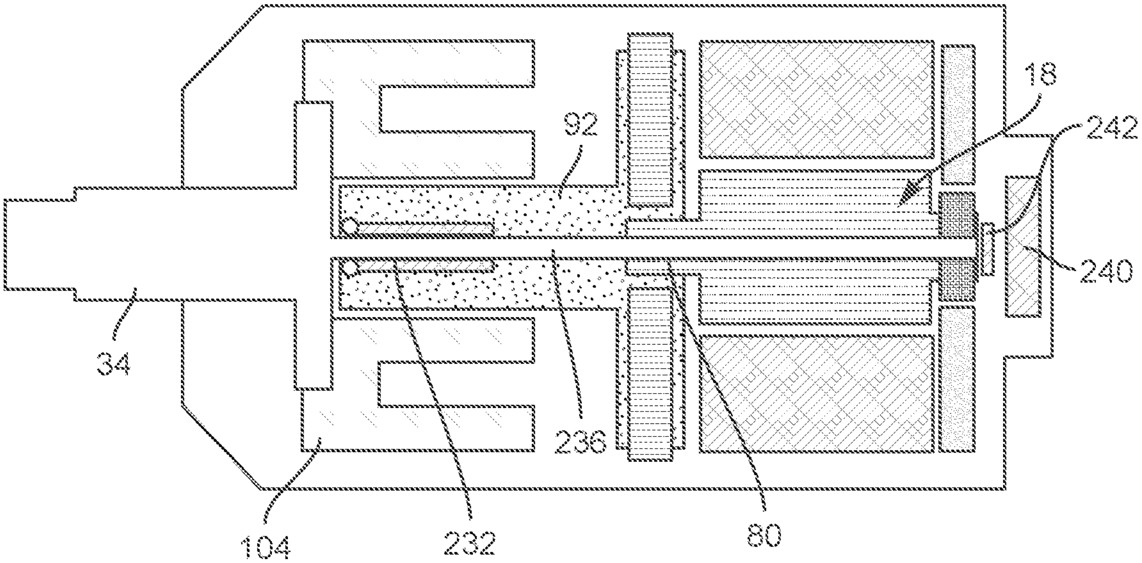
FIG. 26 is a schematic cross-sectional view of a rotary impact tool, according to another embodiment of the invention.

As shown in FIG. 26, in some embodiments, a hydraulic chamber 232 is arranged inside the camshaft 92 for applying a moment to the anvil 34 in the working rotational direction, such that the hydraulic chamber 232 functions as a biasing means to bias the anvil 34 in the working rotational direction. In the embodiment of FIG. 26, the anvil 34 has a rearward extension 236 extending through the camshaft 92 and motor 18 to the rear of the tool 10, where a sensor 240 is arranged to detect a rotation of the rearward extension 236, and thus the anvil 34. By directly measuring rotation of the anvil 34, the rotational position of the anvil 34 can be more accurately determined as compared to estimating the position of the anvil 34 using one or more upstream drive components (e.g., the rotor 80).

As illustrated in FIG. 26, the sensor 240 is rearward of the motor 18. In some embodiments, the sensor 240 includes a magnet 242 and a directional magnetic sensor or other rotary sensor. In some embodiments, the sensor 240 includes a Hall-effect sensor or an encoder. In response to the sensor 240 detecting the rotation of the rearward extension 236, operation of the motor 18 can be adjusted. In some embodiments, the hydraulic chamber 232 to bias the anvil 34 in the working rotational direction is omitted, but the rearward extension 236 and sensor 240 remain. That is, the rearward extension 236 and sensor 240 may be incorporated into other embodiments, such as those described and illustrated herein, to monitor a position and/or rotational velocity of the anvil 34.

Figure 27:
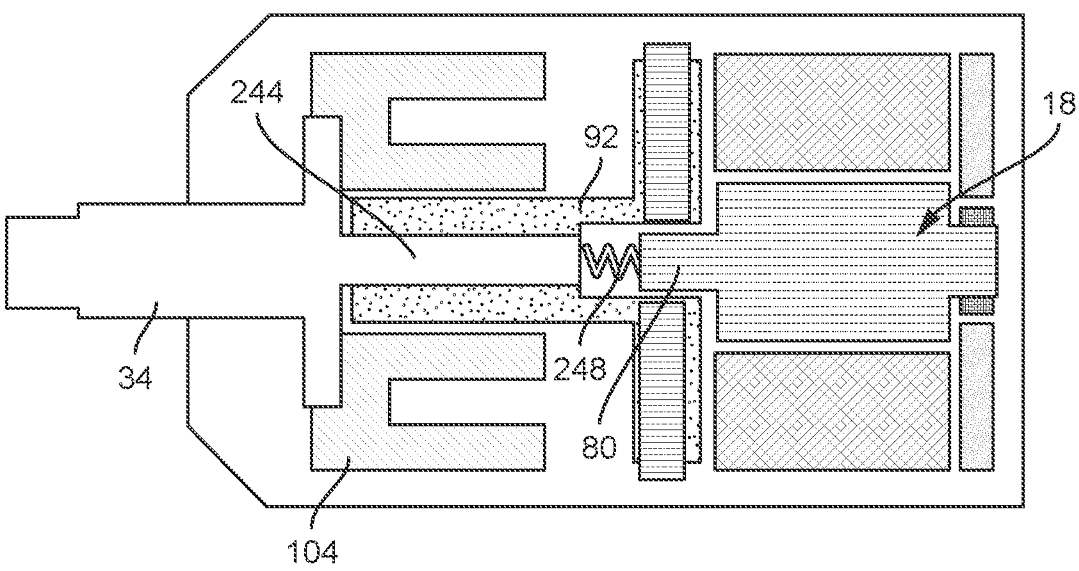
FIG. 27 is a schematic cross-sectional view of a rotary impact tool, according to another embodiment of the invention.

As shown in FIG. 27, in another embodiment, the anvil 34 includes a rearward extension 244 extending through the camshaft 92, and a spring 248 is arranged between the forward end of the rotor 80 and the rearward extension 244, such that the rotor 80 (via the spring 248) can be used as a biasing means to bias the anvil 34 in the working rotational direction. In some embodiments, instead of the spring 248, an eddy current from the high speeds of the motor 18 could be used to bias the anvil 34 in the working rotational direction. In some embodiments, a magnet (not shown) coupled to the rotor 80 generates eddy currents on the rearward extension 244 to bias the anvil 34 in the working rotational direction. In some embodiments, the rotor 80 may extend through all or part of the camshaft 92 to exert a biasing torque on the anvil 34.

Figure 28:
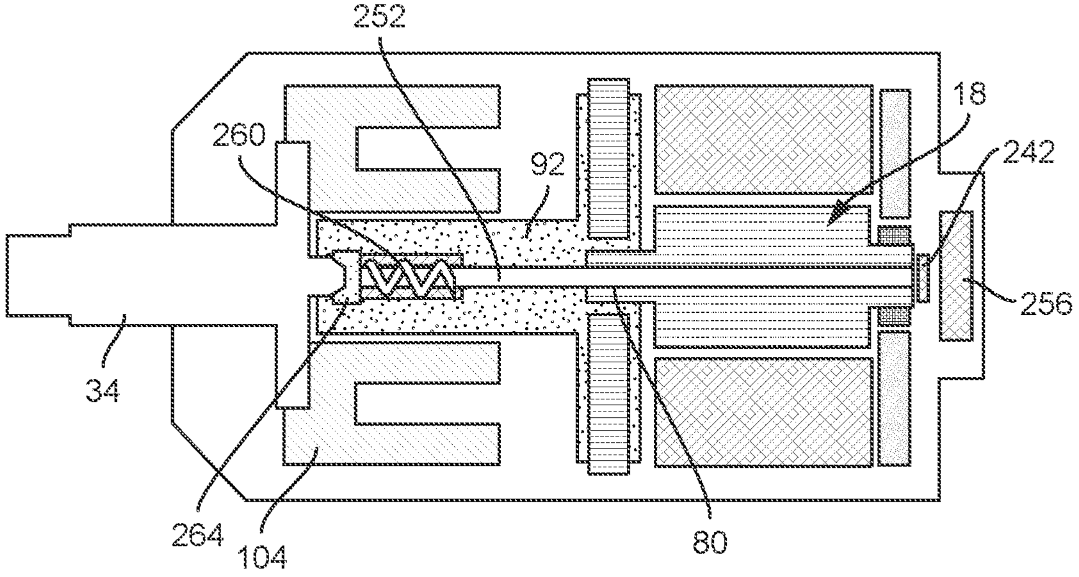
FIG. 28 is a schematic cross-sectional view of a rotary impact tool, according to another embodiment of the invention.

As shown in FIG. 28, in some embodiments, the anvil 34 includes a rearward extension 252 extending through the camshaft 92 and motor 18 to the rear of the tool 10, where a sensor 256 is arranged to detect a rotation of the rearward extension 252, and thus the anvil 34. Also, a spring 260 is arranged inside the camshaft 92 to bias a keyed member 264 that frictionally engages with the anvil 34 to bias the anvil 34 in the working rotational direction, such that the spring 260 and keyed member 264 function as a biasing means to bias the anvil 34 in the working rotational direction. In some embodiments, the sensor 256 functions in the same manner as the sensor 240, such that in response to the sensor 256 detecting the rotation of the rearward extension 252, operation of the motor 18 can be adjusted.

Figure 29:
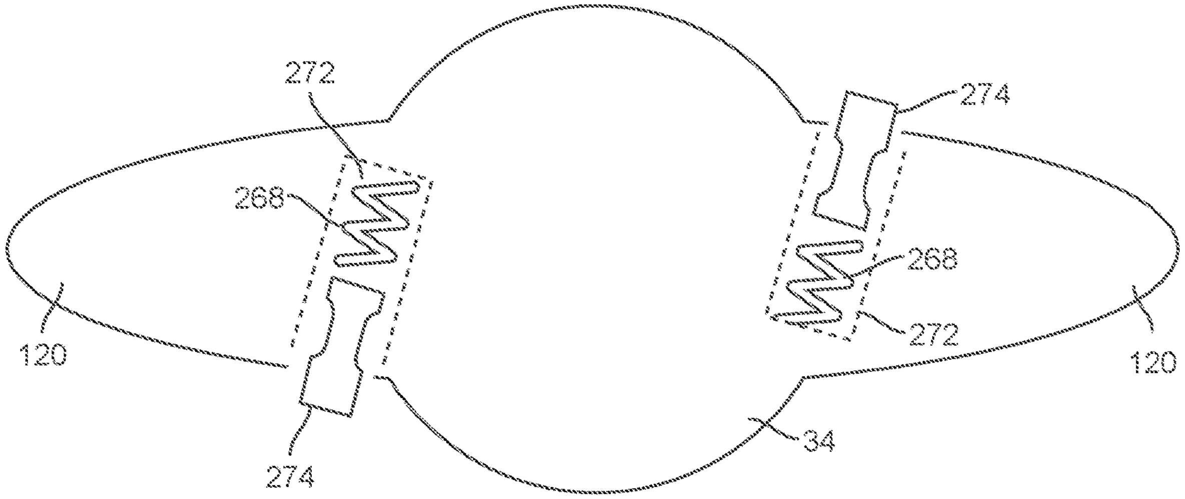
FIG. 29 is a cross-sectional view of an anvil, according to another embodiment of the invention.

In an embodiment shown in FIG. 29, the anvil 34 includes one or more springs 268 trapped within but partially extending from recesses 272. The springs 268 respectively bias pins 274 out of the recesses 272. In operation of the embodiment of FIG. 29, the hammer lugs 118 contact the pins 274 before contacting the anvil lugs 120, thus imparting a moment to the anvil 34 in the working rotational direction, such that the springs 268 and pins 274 function as a biasing means to bias the anvil 34 in the working direction. As rotation of the hammer 104 continues, the springs 268 compress into the recesses 272 and the hammer lugs 118 impact the anvil lugs 120 to drive the anvil 34 in the working rotational direction. In some embodiments, the springs 268, recesses 272, and pins 274 are arranged on a distal portion of the anvil 34 that engages the socket, such that the anvil 34 is biased in the working rotational direction towards the socket. In some embodiments, the springs 268, recesses 272, and pins 274 are arranged on the socket, such that the socket is biased in the working rotational direction towards (e.g.) a bolt or nut.

In some embodiments, one or both of the anvil 34 and hammer 104 are magnetized, such the anvil 34 is biased in the working rotational direction by the hammer 104. Thus, the magnetized anvil 34 and/or hammer 104 function as a biasing mean to bias the anvil 34 in the working rotational direction. In operation, as the hammer lugs 118 approach the anvil lugs 120 but prior to the hammer lugs 118 impacting the anvil lugs 120, a moment is imparted to the anvil 34 in the working rotational direction due to the repulsive magnetic force existing between the hammer 104 and anvil 34. Subsequently, rotation of the hammer 104 continues and the hammer lugs 118 impact the anvil lugs 120 to drive the anvil 34 in the working rotational direction.

In some embodiments, the impact housing 30 includes windings that function as a biasing means to bias the anvil lugs 120 in the working rotational direction. The windings could be placed in front of or surrounding the circumference of the anvil lugs 120. In some embodiments, a printed circuit board or circuit is integrated into or proximate the impact housing 30 to providing lighting as well as biasing the anvil 34 in the working rotational direction. In some embodiments, the impacts upon the anvil 34 by the hammer 104 propel a component to rotationally ratchet, thereby biasing the anvil 34 in the direction of the impact.

Figure 30:
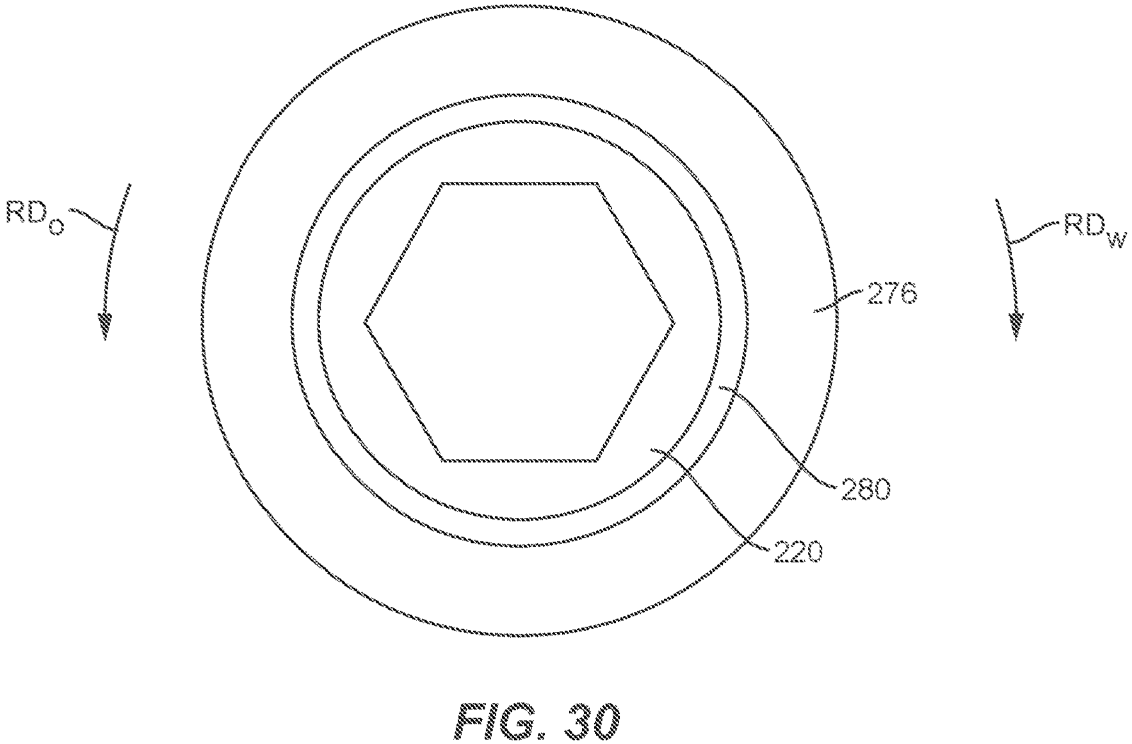
FIG. 30 is a cross-sectional view of a nut on a socket, according to another embodiment of the invention.

As shown in the embodiment of FIG. 30, an outer mass 276 is coupled to the socket 220 via a viscous layer of material 280. As the socket 220 receives torque from the anvil 34, due to the rundown and repeated impacts delivered by the hammer 104 upon the anvil 34, the outer mass 276 is caused to rotate. In between impacts, the outer mass 276 keeps rotating in the working rotational direction due to its inertia, which causes the anvil 34 to be biased in the working rotational direction via the viscous layer of material 280.

Thus, the outer mass 276 and the viscous layer of material 280 function as a biasing means to bias the anvil 34 in the working rotational direction. In some embodiments, a ratchet could be employed to increase the torque transferred to the outer mass 276. In some embodiments, a spring (not shown) is included in addition to or in replacement of the viscous layer of material 280, in order to bias the socket 220 in the working rotational direction, by transferring torque to and from the outer mass 276.

Any of the above biasing means to bias the anvil 34 or socket 220 in the working rotational direction could be implemented with the embodiments of the impact mechanism 32, the impact mechanism 1000, or the impact mechanism 2000. For any of the non-viscous embodiments described above, it may be desirable to bias the anvil 34 or socket 220 in only one direction. For example, one benefit of biasing in the anvil 34 or socket 220 in only the direction opposite the working rotational direction, is that the tool may output more torque for breakaway than it can for seating a bolt.

Figure 31:
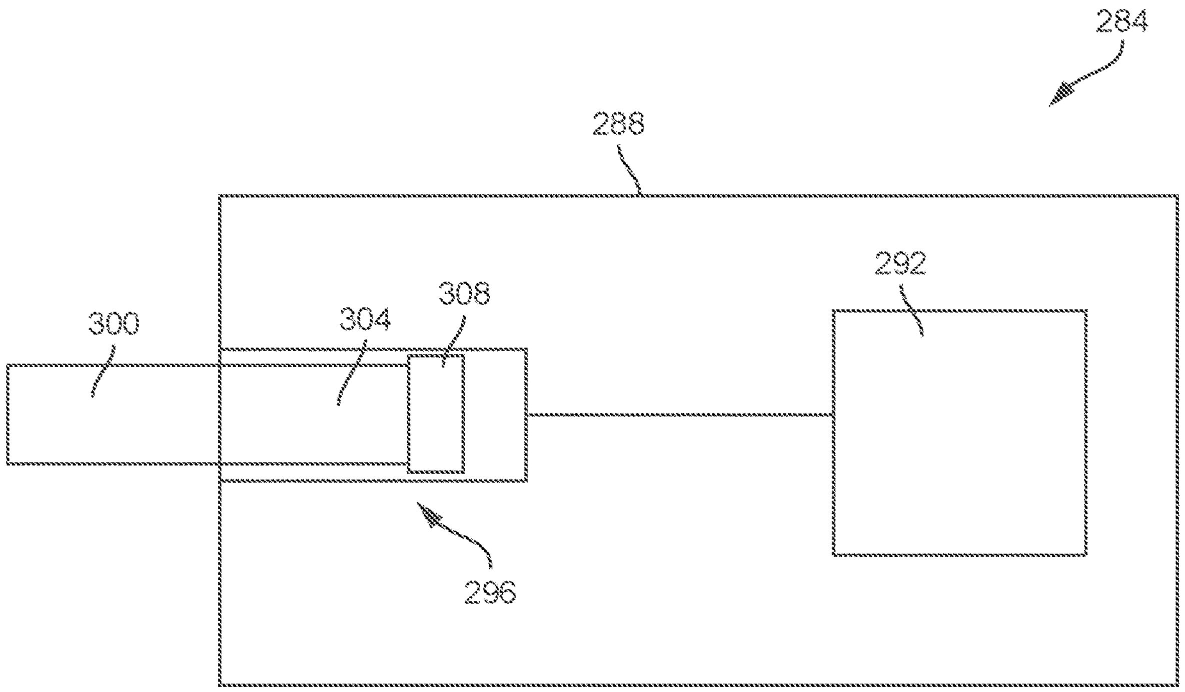
FIG. 31 is a schematic view of a power tool, according to another embodiment of the invention.

FIG. 31 schematically illustrates a power tool 284 having a housing 288 and a motor 292 arranged in the housing 288 and configured to provide torque to a striking mechanism 296. The striking mechanism 296 is configured to convert a continuous torque input from the motor 292 to consecutive axial impacts upon a workpiece, fastener or tool bit 300. Specifically, the striking mechanism 296 includes an anvil 304 configured to deliver the consecutive axial impacts to the workpiece, fastener or tool bit 300. The striking mechanism 296 also includes a means 308 for biasing the anvil 304 in an axial direction toward the workpiece, fastener or tool bit 300. Thus, after the anvil 304 delivers an axial impact to the workpiece, fastener or tool bit 300 in a first direction, the biasing means 308 inhibits the anvil 304 from rebounding in a second direction that is opposite the first direction. In some embodiments, the power tool 284 is a palm nailer (in which the anvil 304 is biased towards the workpiece). In some embodiments, the power tool 284 is a rotary hammer (in which the anvil 304 is spring biased axially towards the workpiece). In some embodiments, the biasing means 308 is a compression spring. In other embodiments, the biasing means 308 may be a wave spring, a pair of repelling magnets, or the like.

Various features of the invention are set forth in the following claims.

What is claimed is:

1. A rotary impact tool comprising:

a housing;

an electric motor supported in the housing; and an impact mechanism for converting a continuous torque input from the motor to consecutive rotational impacts upon a workpiece, the impact mechanism including an anvil, a hammer that is both rotationally and axially movable relative to the anvil for imparting the consecutive rotational impacts upon the anvil, the hammer configured to rotate about an axis in a rotational direction when imparting the consecutive rotational impacts upon the anvil, a camshaft driven by the motor to rotate about the axis, the camshaft including a bore extending parallel to the axis, wherein the hammer is axially movable along the camshaft, a hammer spring configured to bias the hammer in an axial direction toward the anvil, and a means for biasing the anvil in the rotational direction about the axis, wherein the means for biasing the anvil includes a pin received within the bore and a spring configured to bias the pin into engagement with the anvil.

2. The rotary impact tool of claim 1, wherein the anvil includes a rear face facing the hammer and a groove formed in the rear face, and wherein the pin is configured to travel along the groove in response to rotation of the camshaft relative to the anvil.

3. The rotary impact tool of claim 2, wherein the groove includes an inclined surface oriented at an angle relative to the rear face, wherein the pin is engageable with the inclined surface, and wherein engagement between the pin and the inclined surface imparts a moment on the anvil in the rotational direction about the axis.

4. The rotary impact tool of claim 1, wherein the bore is one of a plurality of bores in the camshaft, and the pin is one of a plurality of pins, each received in a respective one of the plurality of bores and biased into engagement with the anvil.

5. A rotary impact tool comprising:

a housing;

an electric motor supported in the housing; and an impact mechanism for converting a continuous torque input from the motor to consecutive rotational impacts upon a workpiece, the impact mechanism including an anvil, a hammer that is both rotationally and axially movable relative to the anvil for imparting the consecutive rotational impacts upon the anvil, the hammer configured to rotate about an axis in a rotational direction when imparting the consecutive rotational impacts upon the anvil, a spring configured to bias the hammer in an axial direction toward the anvil, and a means for biasing the anvil in the rotational direction about the axis wherein the means for biasing the anvil includes a washer.

6. The rotary impact tool of claim 5, wherein the impact mechanism includes a camshaft, wherein the anvil includes a rear face facing the hammer and a groove formed in the rear face, wherein the washer includes a leaf spring having a distal end, and wherein the distal end of the leaf spring is configured to travel along the groove in response to rotation of the camshaft relative to the anvil.

7. The rotary impact tool of claim 5, wherein the washer includes a plurality of leaf springs.

8. A rotary impact tool comprising:

a housing;

an electric motor supported in the housing;

an impact mechanism for converting a continuous torque input from the motor to consecutive rotational impacts upon a workpiece, the impact mechanism including an anvil, a hammer that is both rotationally and axially movable relative to the anvil for imparting the consecutive rotational impacts upon the anvil, the hammer configured to rotate about an axis in a rotational direction when imparting the consecutive rotational impacts upon the anvil, a spring configured to bias the hammer in an axial direction toward the anvil, and a means for biasing the anvil in the rotational direction about the axis, wherein the anvil includes a rearward extension that extends through the electric motor; and a sensor configured to detect rotation of the rearward extension.

9. The rotary impact tool of claim 8, wherein the rotary impact tool is configured to adjust operation of the electric motor in response to the detected rotation of the rearward extension.

10. The rotary impact tool of claim 8, further comprising a magnet positioned on the rearward extension of the anvil, wherein the sensor is configured to detect rotation of the magnet.

11. The rotary impact tool of claim 8, wherein the impact mechanism includes a camshaft, and wherein the means for biasing the anvil includes a spring arranged inside the camshaft.

12. The rotary impact tool of claim 11, wherein the means for biasing the anvil includes a keyed member that frictionally engages the anvil.

13. The rotary impact tool of claim 8, wherein the means for biasing the anvil includes a hydraulic chamber.

14. The rotary impact tool of claim 13, wherein the impact mechanism includes a camshaft, and wherein the hydraulic chamber is arranged inside the camshaft.

15. The rotary impact tool of claim 8, wherein the sensor includes a Hall-effect sensor.

* * * * *